United States Patent [19]
Hohmann et al.

[11] 3,862,967
[45] Jan. 28, 1975

[54] TETRA-α-SUBSTITUTED ANTHRAQUINONE DERIVATIVES

[75] Inventors: Walter Hohmann; Heinrich Vollmann, both of Leverkusen; Hans-Samuel Bien, Burscheid; Günter Gehrke, Cologne, all of Germany

[73] Assignee: Bayer Aktiengesellschaft, Leverkusen, Germany

[22] Filed: Dec. 5, 1968

[21] Appl. No.: 785,014

Related U.S. Application Data

[63] Continuation of Ser. No. 527,502, Feb. 15, 1966, abandoned.

[30] Foreign Application Priority Data
Feb. 19, 1965 Germany.................................. 45295

[52] U.S. Cl................ 260/377, 8/39, 8/40, 260/247.1 A, 260/247.2 A, 260/247.5 K, 260/272, 260/371, 260/372, 260/373, 260/374, 260/378, 260/379, 260/380, 260/381
[51] Int. Cl. ........................... C09b 1/50, C09b 1/56
[58] Field of Search ..................................... 260/377

[56] References Cited
UNITED STATES PATENTS
2,053,275  9/1936  Ellis et al. ........................... 260/377
FOREIGN PATENTS OR APPLICATIONS
69,939  1/1959  France ............................... 260/377

*Primary Examiner*—Lorraine A. Weinberger
*Assistant Examiner*—Jane E. Skelly
*Attorney, Agent, or Firm*—Plumley & Tyner

[57] ABSTRACT

Anthraquinone dyestuffs of the formula:

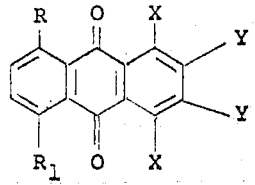

wherein X is hydroxyl or amino; Y is hydrogen, chlorine or bromine; R is chlorine, amino, acid amide radical, or mercapto; and $R_1$ is an amino group which may be unsubstituted or substituted, an acid amide radical, or mercapto. A process for dyeing and printing synthetic fibers using the above-described dyestuffs.

3 Claims, No Drawings

TETRA-α-SUBSTITUTED ANTHRAQUINONE DERIVATIVES

This application is a continuation of co-pending application Ser. No. 527,502, now abandoned.

The present invention is concerned with new tetra-α-substituted anthraquinone dyestuffs, with their use as dyestuffs and with the preparation thereof.

We have found that tetra-α-substituted anthraquinone derivatives of the general formula:

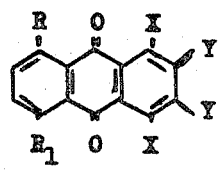

in which X stands for a hydroxyl or amino group, Y stands for a hydrogen, chlorine or bromine atom, R stands for a chlorine atom, an unsubstituted or substituted amino group, an acid amide radical or a mercaptan radical, and $R_1$ stands for an amine group substituted by one or two hydrocarbon radicals, which may in turn be substituted, or for an acid amide or mercaptan radical, are suitable for dyeing or printing synthetic fibres.

As substituted amino groups, the dyestuffs according to the present invention may contain amino groups which are substituted by hydrocarbon radicals, and these in turn may be further substituted. The amino groups may also be substituted by one or more alkyl, aralkyl, cycloalkyl or aryl radicals. The alkyl radicals are preferably alkyl radicals containing up to 6 carbon atoms and may be linked with one another via hetero atoms, as is the case, for example, in piperidino or morpholino radicals. The cyclohexyl radical is preferably used as the cycloalkyl radical and the phenyl radical as aryl radical. As substituents, the hydrocarbon radicals may contain substituents customary in anthraquinone chemistry, for example, amino groups, acylated amino groups, such as the acetylamino group; alkoxy groups, preferably those with lower alkyl radicals, such as methoxy, ethoxy or propoxy; halogen atoms, such as chlorine, bromine or fluorine; or hydroxyl groups or hydroxyalkyl groups, such as the hydroxyethyl group. The aryl or cycloalkyl radicals may also be substituted by alkyl radicals, preferably lower alkyl radicals. The acid amides are preferably those of simple aliphatic and aromatic carboxylic acids and sulphonic acids, for example, benzamide and toluene-sulphamides. Other suitable mercaptan radicals are those substituted by hydrocarbon radicals which may contain further conventional substituents.

The following compounds are examples of dyestuffs according to the present invention:
1,4-dihydroxy-5-amino-8-methylamino-anthraquinone, 1,4-dihydroxy-5-hydroxyethylamino-8-cyclohexylamino-anthraquinone, 1,4-dihydroxy-5-amino-8-anilino-anthraquinone, 1,4-dihydroxy-5-tert-butylamine-8-(4'-acetamino-anilino)-anthraquinone, 1,4-dihydroxy-5-amino-8-(4'-amino-anilino)-anthraquinone, 1,4-dihydroxy-5-amino -8-(o- or -p-anisidino)- anthraquinone, 1,4-dihydroxy-5-amino-8-(p-fluoroanilino)-anthraquinone, 1,4-dihydroxy-5-hydroxyethylamino-8-(m-chloroanilino)-anthraquinone, 1,4-dihydroxy-5-methyl- amino-8-(m-methoxy-p-methyl-anilino)-anthraquinone, 1,4-dihydroxy-5-isobutylamino-8-(p-methyl-cyclohexylamino)-anthraquinone, 1,4-dihydroxy-5-diethyl-amino-8-p-toluidino-anthraquinone, 1,4-dihydroxy-5-amino-8-(p-tert.-butylanilino)-anthraquinone, 1,4-dihydroxy-5-benzylamino-8-m-toluidino-anthraquinone, 1,4-dihydroxy 5-cyclohexylamino-8-p-toluidino-anthraquinone, 1,4-dihydroxy-2-chloro-5-amino-8-(p-methoxy-m-chloroanilino)-anthraquinone, 1,4-dihydroxy-2,3-dichloro-5-methyl-amino-8-hydroxyethylamino-anthraquinone, 1,4-dihydroxy-5-anilino-8-o-anisidino-anthraquinone 1,4-dihydroxy-5-(o-ethylanilino)-8-(p-chloro-anilino)-anthraquinone, 1,4-dihydroxy-5-m-phenetidino-8-o-anisidino-anthraquinone, 1,4-dihydroxy-5-(2,6-dimethyl-anilino)-8-(3,4-dimethyl-anilino)-anthraquinone, 1,4-dihydroxy-5-amino-8-(p-cyclohexy-anilino)-anthraquinone, 1,4-dihydroxy-5-amino-8-(p-phenyl-anilino)-anthraquinone, 1,4-dihydroxy-5-amino-8-naphthylamino-(2)-anthraquinone, 1,4-dihydroxy-5,8-dianilino-anthraquinone, 1,4-dihydroxy-5,8-di-(o-,-m-and -p-toluidino)-anthraquinone, 1,4-dihydroxy-5,8-di-(p-tert. butylanilino)-anthraquinone, 1,4-dihydroxy-5,8-di-m-phenetidino-anthraquinone, 1,4-dihydroxy-5,8-di-(p-chloroanilino)-anthraquinone, 1,4-dihydroxy-5-methylamino-8-p-toluene-sulphamido-anthraquinone, 1,4-dihydroxy-5-amino-8-p-toluene-sulphamido-anthraquinone, 1,4-dihydroxy-5-cyclohexylamino-8-e-toluene-sulphamido-anthraquinone, 1,4-dihydroxy-5-anilino-8-benzamido-anthraquinone, 1,4-dihydroxy-5-anilino-8-acetylamino-anthraquinone, 1,4-dihydroxy-5-amino-8-(o-, -m- and -p-methyl-phenylmercapto)-anthraquinone, 1,4-dihydroxy-5-hydroxyethylamino -8-hydroxyethyl-mercapto-anthraquinone, 1,4-dihydroxy-5-methylamino-8-(p-chloro-phenylmercapto)-anthraquinone, 1,4-dihydroxy-5-anilino-8-thiophenoxy-anthraquinone, 1,4-dihydroxy 5-cyclohexylamino-8-(p-methyl-phenylmercapto-anthraquinone, 1,4-dihydroxy-5-anilino-8-(p-carbethoxy-anilino)-anthraquinone, 1,4-dihydroxy-5-amino-8-(3,4-dichloroanilino)-anthraquinone, 1,4-diamino-5-hydroxyethylamino-8-chloroanthraquinone, 1,4-diamino-5,8-di-(hydroxyethylamino)-anthraquinone, 1,4-diamino-5-(γ-dimethylamino -propylamino)-8-chloroanthraquinone, 1,4-diamino-8-chloro-5-(γ-trimethylamino-propylamino)-anthraquinone sulphate, 1,4-diamino-5-(γ-dimethylamino-propylamino)-8-hydroxyethylamino-anthraquinone, 1,4-diamino-2,8-dichloro-5-(γ-dimethylaminopropyl-amino)-anthraquinone, 1,4-diamino-2,3,8-trichloro- 5-anilino-anthraquinone, 1,4-diamino-5-thiophenylmercapto-8-anilino-anthraquinone, 1,4-diamino-5-(2'-amino-ethylamino)-8-hydroxyethylamino, 1,4-diamino-5,8-di-(γ-dimethylamino-propylamino-anthraquinone, 1,4-diamino-5,8-di-(piperidino)-anthraquinone, 1,4-diamino-5-morpholino-8-(γ-dimethylamino-propylamino)-anthraquinone, 1-amino-4-hydroxy-5-

(8)-anilino-8-(5)-chloroanthraquinone, 1-amino-4-hydroxy-2-bromo-5-(8)-(γ-dimethylamino-propylamino)-8-(5)-hydroxyethylamino-anthraquinone, 1-amino-4-hydroxy-2-chloro-5-(8)-methylamino-8-(5)-anilino-anthraquinone, 1-amino-4-hydroxy-5-(8)-phenylmercapto-8-(5)-p-toluidino-anthraquinone, 1-hydroxy-4,5-(8)-diamino-3-bromo-8-(5)-anilino-anthraquinone, 1-hydroxy-4,5-(8)-diamino-8-(5)-p-toluene-sulphamido-anthraquinone, 1-amino-4-hydroxy-5-(8)-(m-methyl-phenylmercapto)-8-(5)-p-anisidino-anthraquinone, 1-amino-4-hydroxy 3-bromo-5,8-di-(p-toluidino)-anthraquinone and 1-amino-4-hydroxy-5-(8)-methylamino-8-(5)-(-p-chloroanilino)-anthraquinone.

The dyestuffs according to the present invention can be obtained by reacting 5,8-dichloro derivatives of 1,4-dihydroxy-, 1-amino-4-hydroxy- and 1,4-diamino-anthraquinone, which may also contain chlorine or bromine in the 2- and/or 3-positions, with ammonia or an appropriate amine, acid amide or mercaptan, the two chlorine atoms in the 5- and 8-positions being exchanged, either partially or completely, for identical or different radicals R and $R_1$ of the type described above. It is possible to replace, in the first instance, only one of the chlorine atoms in the 5- and 8-positions by one of the radicals R or $R_1$. If the intermediate product thus obtained, which still contains one chlorine atom in the 5- or 8-position, is isolated and then reacted, in a second reaction, with another of the abovementioned reaction components, dyestuffs are obtained which have different substituents in the 5- and 8-positions.

Substantially the same dyestuffs, but with a lower content of the corresponding reaction products symmetrically substituted in the 5- and 8-positions, can also be obtained in a single reaction, that is to say without isolation of the monochloro- product in the following manner. Either the reaction component which is to be used first is used only in a slight excess over the threoretically necessary amount in the presence of a solvent, such as nitrobenzene, and the second reaction component is added only after the conversion of the first, and reacted, if necessary, at elevated temperatures; or the starting material containing two chlorine atoms in the α-position is heated directly with a mixture of two of the above-mentioned reaction components. In the latter case, it is expedient to choose the proportions of the mixture in such a manner that, in the case where these compounds have a substantially different reactivity, the more inert component is present in the mixture in a correspondingly higher proportion.

The reactions can be carried out at an elevated temperatue of about 50° to 220°C. and, in general, in the presence of an acid-binding agent, such as alkali metal carbonate or acetate. Inert compounds such as butanol, glycol, diglycol ethers, dimethyl formamide, chlorobenzenes or, preferably, nitrobenzene, can be used as solvents, unless reaction components added in excess act as solvents.

It is not necessary to use the dyestuffs according to the present invention in a particularly homogeneous form. It has been found, on the contrary, that mixtures of related types of dyestuffs with the general formula given above frequently have better dyeing properties than the homogeneous components of the mixture, especially in respect of the affinity and fastness to rubbing. Mixtures of this type can be prepared from the homogeneous components, for example, by dispersing them together, Dyestuff mixtures of this type can also be obtained directly in the production of the dyestuffs.

Examples of synthetic fibres to which the new dyestuffs can be applied are fibre materials based on cellulose acetate, linear polyesters, polyamides or polyacrylonitrile. The dyestuffs substituted in the 1- or 4-position by hydroxyl groups are preferable for dyeing and printing fibre materials based on cellulose acetate, linear polyesters or polyamides, whereas the dyestuffs substituted in the 1- and 4-positions by amino groups yield especially good results on fibre materials based on polyacrylonitrile, provided that the substituents R or $R_1$ contain solubilizing groups. The dyeing and printing of the synthetic fibre materials can be carried out by known methods. The dyestuffs can be applied, for example, without pressure with the addition of known adjuvants, i.e. so-called "carriers," or under a slightly elevated pressure at temperatures of about 120°C. (HT process), or, for example, by briefly heating the materials padded or printed with the dyestuffs at temperatures of 180° to 220°C. (thermosol process). The dyebaths or printing mixtures may obviously contain conventional additives. The dyeing and prints obtained have very good fastness properties, especially very good fastness to light, rubbing, sublimation and washing.

The following Examples are given for the purpose of illustrating the invention, the parts being parts by weight unless otherwise stated.

Example 1 a. 10 parts of a fabric of synthetic polyamide are slowly heated to boiling temperature in a bath containing 400 parts, water, 0.2 part 5-amino-8-(4'-acetamino-anilino)-quinizarin in finely dispersed form and 0.2 part of a conventional dispersing agent, and dyed at the boil for 1 hour. The fabric is subsequently rinsed, optionally slightly soaped, and dried. A deep green-blue dyeing of good fastness to washing, light and rubbing is obtained.

b. The 5-amino-8-(4'-acetamino-anilino)-quinizarin can be obtained as follows:

Ammonia is introduced for about 15 hours into a solution of 25 parts 5,8-dichloroquinizarin in 250 parts nitrobenzene. When the reaction is completed, the crystallisation product is filtered off with suction when cold, and washed with nitrobenzene and methanol. The 5-amino-8-chloro-quinizarin is obtained in a satisfactory yield. By dissolving in about 90% sulphuric acid and diluting the solution to an acid content of about 65%, the product can be obtained completely pure. Needles with a greenish metallic lustre are obtained from dimethyl formamide. The colour of the solution in concentrated sulphuric acid is carmine red, turning clear blue on the addition of p-formaldehyde. The colour of the solution of pyridine is carmine red.

50 parts of the 5-amino-8-chloroquinizarin thus obtained, 250 parts nitrobenzene, 25 parts sodium acetate and 75 parts p-amino-acetanilide are boiled under reflux, while distilling off the acetic acid formed, until only a small amount of starting material can be detected by chromatography. The reaction mixture is diluted with 250 parts ethanol, the precipitated product is filtered off with suction at 50°C. and washed with ethanol and water. 45.6 parts 5-amino-8-(p-acetamino-anilino)-quinizarin are obtained. The product can be pasted from sulphuric acid without hydrolysis of the acetylamino group.

Example 2 a. If instead of pure 5-amino-8-(p-acetamino-anilino)-quinizarin, mixtures of this compound with 25 - 40% 5-amino-8-(p-amino-anilino-quinizarin are used in Example 1(a), substantially fuller, strongly bluish-green dyeings of good fastness to washing and very good fastness to light and rubbing are obtained on synthetic polyamide. Within the stated limits, the dyeing is largely independent, with regard to its shade and fastness properties, of the added amount of 5-amino-8-(p-amino-anilino)-quinizarin.

b. The dyestuff mixture stated in Example 2(a) can be obtained, for example, in a single vessel process in the following manner:

60 parts 5-amino-8-chloroquinizarin obtained according to Example 1(b) are heated with the addition of 30 parts sodium acetate in a solution of 200 parts 4-amino-acet-anilide in 200 parts nitrobenzene at 175° - 180°C for 3 - 4 hours. The reaction mixture is then diluted with 400 parts ethanol, the precipitated reaction product is filtered off with suction at 80°C., washed with plenty of ethanol, extracted by stirring with dilute hydrochloric acid at 60°C., filtered off with suction, washed until neutral and dried. 71 parts 5-amino-8-(p-amino-anilino)-quinizarin containing about 25 - 30% 5-amino-8-(p-amino-anilino)-quinizarin are obtained.

c. It is also possible, however, to produce pure 5-amino-8-(p-amino-anilino)-quinizarin according to the instruction given below and to mix this in the proportions stated in Example 2(a) with the pure 5-amino-8-(p-acetamino-anilino)-quinizarin obtained according to Example 1(b):

20 parts 5-amino-8-chloroquinizarin, 20 parts p-phenylenediamine and 20 parts sodium acetate are heated under reflux with 200 parts nitrobenzene, until starting material can no longer be detected (about 40 minutes). The reaction mixture is allowed to cool, diluted with 100 parts ethanol, starting at 120°C., the precipitated reaction product is filtered off with suction at 75°C. and worked up in the manner described in Example 1. 20.5 parts of 1-amino-4-(4'-amino-anilino)-5,8-dihydroxy -anthraquinone are obtained in the form of blue leaflets. The colour of the solution in concentrated sulphuric acid is blue-violet, changing into a clear yellowish green on the addition of formaldehyde. When the sulphuric acid solution is poured into water, a Bordeaux-coloured paste is obtained, whose shade turns green-blue upon the addition of sodium hydroxide solution. The colour of the solution in pyridine is blue-green.

Example 3 a. A fabric of polyethylene glycol terephthalate fibres is impregnated on a foulard with a liquor containing, per 1000 parts, 20 parts of finely dispersed 5-tert.butyl-amino-8-(p-acetamino -anilino)-quinizarin and 10 parts of a thermosol adjuvant, especially a polyether as described, for example, in Belgian Patent Specification No. 615,102.

The fabric is then squeezed off to a weight increase of 70% and dried in a moving nozzle drier or drying cabinet at 80 - 120°C. The fabric is subsequently treated on a stenter or nozzle hot flue with hot air at 190° - 200°C. for about 45 seconds, then rinsed, possibly reductively after-treated, and dried. The reductive after-treatment for removing dyestuff particles superficially adhering to the fibres can be carried out in such a manner that the fabric is introduced at 25°C. into a bath which contains 3 - 5 cc/litre of a sodium hydroxide solution of 48°B and 1 -2 g/litre concentrated hydrosulphite, heating to 70°C. within about 15 minutes and keeping the bath at 70°C. for a further 10 minutes. The fabric is subsequently rinsed while hot, acidified at 50°C. with 2 -3 cc/litre of 85% formic acid, rinsed and dried. A clear green dyeing is obtained, which is characterised by its high dyestuff yield and good texturing power as well as by good fastness to light, thermofixing, rubbing and washing.

A very similar dyeing is obtained, when polyester fibres from 1,4-bis-hydroxymethyl-cyclohexane and terephthalic acid are dyed, instead of the polyethylene terephthalate fibres.

b. A fabric of polyethylene terephthalate fibres, previously cleaned and thermofixed, is printed with a printing paste consisting of the following components:

40 g 5-(tert.butylamino)-8-(4'-acetamino-anilino)-quinizarin,
475 g water
465 g crystal gum 1:2 and
20 g sulphonated castor oil.

An alginate thickener may also be used, instead of crystal gum. For fixation of the dyestuff, the printed and dried material is passed over a high capacity stenter or through a condensing apparatus. The duration of the treatment is about 30 - 60 seconds. The fixed print obtained is subsequently rinsed cold, soaped with 1 - 2 g/litre of an anion-active detergent at 70° - 80°C. for about 10 minutes, rinsed first hot and then cold, and dried. A print is obtained which corresponds to the dyeing of Example 3(a) and is characterised by the same good fastness properties.

c. If a fabric of triacetate is treated on a foulard with 5-tert.-butylamino-8-(p-acetamino-anilino)-quinizarin as described in Example 3(a) and subsequently treated with hot air in the manner described therein, but at 220°C., then a dyeing is obtained which is slightly weaker and somewhat more bluish, but has the same good fastness properties.

d. Polyamide fibres are dyes with 5-tert.butylamino-8-(4'-acetamino -anilino)-quinizarin according to the dyeing instructions given in Example 1(a) in clear green shades of excellent fastness to light, washing and water, but only medium fastness to rubbing.

e. The dyestuff used in Examples 3(a) to 3(d) is obtained as follows:

124 parts 5,8-dichloro-quinizarin and 21.2 parts sodium carbonate are introduced into 600 parts nitrobenzene, the mixture is heated to 175°C., and 44 parts tert.-butylamine are added dropwise at this temperature so that a slight reflux is constantly maintained. The reaction is completed after about 6 - 8 hours. Without isolating the resultant 5-tert-butylamino-8-chloroquinizarin, 150 parts N-acetyl-p-phenylene-diamine and 27.5 parts sodium carbonate are added to the reaction mixture which is stirred at 175 - 180°C. for 12 hours. The mixture is then diluted with 1200 parts methanol, the product filtered off with suction after 2 - 3 hours, and washed with methanol and water.

Example 4 a. A mixture of the product obtained according to Example 3(e) with 5-tert.butylamino-8-(p-amino-anilino)-quinizarin in the ratio 3:1 dyes polyamide fibres according to the dyeing instruction of Example 1(a) in deep green shades of good fastness to rubbing.

b. The 5-tert.butylamino-8-(p-amino-anilino)-quinizarin can be obtained as follows:

A mixture of 17.3 parts 5-tert.-butylamino-8-chloroquinizarin, 15 parts p-phenylene-diamine, 15 parts anhydrous sodium acetate and 180 parts nitrobenzene is stirred at 200 – 210°C. for one hour. After cooling, the reaction mixture is diluted with 350 parts methanol and 35 parts water are carefully added. The reaction product which crystallises in the form of cubes is filtered off with suction, and washed with methanol and water. It dissolves in dimethyl formamide to give a solution with a bluish-green colour.

Example 5 a. 10 parts by weight of a piece of polyethylene terephthalate fabric are dyed at 120° – 130°C. for 2 hours in a bath at pH 4.5 consisting of 400 parts water and 0.1 part of very finely dispersed 5-amino-8-anilino-quinizarin and 0.3 part of a mixture of equal parts of an aralkyl sulphonate and a nonionic polyglycol ether. After rinsing and drying, an intense, strongly greenish-blue dyeing of good fastness to light, washing, sublimation and rubbing is obtained.

b. If a piece of triacetate fabric is treated with 5-amino-8-anilino-quinizarin in the manner described in Example 5(a), then a somewhat weaker greenish-blue dyeing of comparable fastness properties is obtained.

c. The product employed in Example 5(a) is obtained as follows:

10 parts 5-amino-8-chloroquinizarin obtained according to Example 1(b), 70 parts aniline and 7 parts sodium acetate are stirred at 170° – 175°C. for 10 hours. The reaction mixture is stirred until cold, and the reaction product precipitated n the form of blue needles is filtered off with suction and washed with methanol and water. 10 parts 5-amino-8-anilino-quinizarin are obtained.

Example 6 a. 10 parts by weight of polyethylene terephthalate skein material are dyed in a bath adjusted to pH 4 by addition of sulphuric acid consisting of 400 parts water, 0.1 part 5-amino-8-m-toluidino-quinizarin in finely dispersed form, 3.4 parts of a mixture of o-, m-, p-cresotic acid methyl ester and 0.6 part of a mixture of equal parts of an aralkyl sulphonate and a non-ionic polyglycol ether, at 96° – 98°C. for 2 hours, and subsequently rinsed and dried.

The fastness to rubbing can be improved by after-treating for 10 – 30 minutes in a gently boiling bath containing, per 1000 parts water, 5.5 parts sodium hydroxide solution of 38°Be, 2 parts sodium dithionite and 1 part of a polyglycol ether of a fatty acid amide.

b. If skein (triacetate) material is treated in the manner described in Example 6(a), then a very similar, slightly weaker dyeing of comparable fastness properties is obtained.

c. The dyestuff used in Example 6(a) can be prepared as follows:

10 parts 5-amino-8-chloroquinizarin obtained according to Example 1(b), 70 parts m-toluidine and 7 parts sodium acetate are stirred at 170° – 180°C. for 16 hours. Chromatography of a sample indicates only a small amount of starting material. The reaction mixture is diluted with 70 parts ethanol, the precipitated reaction product is filtered off with suction at 70°C., and washed with hot ethanol and water. 7.1 parts 5-amino-8-m-toluidino-quinizarin are obtained in the form of needles with a metallic lustre, which dissolve in concentrated sulphuric acid to give a solution with a dark blue colour changing to yellow-green addition of formaldehyde.

Example 7 a. If instead of 5-amino-8-m-toluidino-quinizarin, the same amount of 5-amino-8-o-toluidino-quinizarin is used in Example 6 (a), then a dyeing is obtained which is only slightly more bluish.

b. The dyestuff used in Example 9(a) can be obtained by reacting 5-amino-8-chloro-quinizarin with o-toluidine at 180° – 185°C. for 30 hours.

Example 8 a. When a polyethylene terephthalate fabric is treated with 5-amino-8-p-toluidino-quinizarin according to the dyeing instructions given in Examples 3(a) and 5(a), intense, strongly greenish-blue dyeings are obtained, whereas the dyeing instruction of Example 6(a) yields a substantially weaker dyeing.

b. The dyestuff used in Example 8(a) can be prepared as follows:

45 parts 5-amino-8-chloroquinizarin and 30 parts sodium acetate are introduced into 300 parts melted p-toluidine, and the mixture is heated at 170° – 175°C. until starting material can no longer be detected in a sample. (about 8 hours). The mixture is stirred until it has cooled to 100°c., diluted with 300 parts ethanol, suction-filtered at 60°C., washed with hot ethanol, and the filtered material extracted by boiling with dilute hydrochloric acid. 40.5 parts 5-amino-8-p-toluidino-quinizarin are obtained in the form of hexagonal blue platelets. The product dissolves in concentrated sulphuric acid to give a solution with a red colour which changes to dark green with boric acid and to yellow-green with formaldehyde. The colour of the solution in dimethyl formamide is a clear green-blue.

Example 9 a. A fabric of polyethylene terephthalate fibres is treated with mixtures of the dyestuffs obtained in Examples 6(c) and 8(b) and 7(b), respectively, according to the dyeing instructions given in Examples 5(a) and 6(a), in the proportions 25:75 and 75:25%, respectively. Deep, strongly greenish-blue dyeings of good fastness to light, washing, sublimation and rubbing are obtained. Compared with dyeings obtained with the pure dyestuffs by the same method, the dyeings thus obtained are distinguished by improved affinity, fuller shades and, in some cases, also by an even better fastness to rubbing.

b. If skein material of triacetate is dyed with the mixtures used in Example 9(a), according to Examples 5(b) and 6(b), then strong dyeings of comparable fastness properties are again obtained, with a somewhat more bluish shade. In this case also the mixtures yield more intense dyeings than the pure dyestuffs.

Example 10 a. Polyethylene terephthalate is dyed with 5-amino-8-p-anisidino-quinizarin according to the instructions given in Examples 5(a) and 6(a) in intense greenish-blue shades fast to sublimation and rubbing.

b. The product used in Example 10(a) is prepared as follows:

6 parts 5-amino-8-chloroquinizarin, 40 parts p-anisidine and 3 parts sodium acetate are stirred at 170° – 175°C. for 4 hours. The reaction mixture is diluted with 40 parts ethanol, starting at 130°C., suction-filtered at 80°C., washed with plenty of boiling ethanol, the filter cake is extracted by boiling with dilute hydrochloric acid, filtered off with suction, washed until neutral, and dried. 6 parts 5-amino-8-p-anisidino-quinizarin are obtained in the form of blue needles which dissolve in concentrated sulphuric acid to give a solution with a violet colour, and in borosulphuric acid to give a solution with a green colour.

Example 11 a. Polyethylene terephthalate fibres are dyed with 5-amino-8-o-anisidino-quinizarin according to the instructions of Examples 3(a), 5(a) and 6(a) in full green-blue shades of good fastness to sublimation and rubbing.

b. The 5-amino-8-o-anisidino-quinizarin is obtained as follows:

If the same amount of o-anisidine is used in Example 10(b), instead of p-anisidine, but the mixture is stirred at 170° – 175°C. for 8 hours, diluted with 80 parts ethanol and suction-filtered at 40°C., 7 parts of 5-amino-8-o-anisidino-quinizarin are obtained in the form of blue needles with a violet-red lustre, which dissolve in concentrated sulphuric acid to give a solution with a blue-violet colour. The shade turns yellow-green upon the addition of formaldehyde.

Example 12 a. A mixture of equal parts of the dyestuffs obtained according to Examples 10(a) and 11(b) dyes triacetate material according to the dyeing Examples 3(c), 5(b) and 6(b) in greenish-blue shades of good fastness to sublimation and washing.

The mixture used in Example 12(a) dyes polyethylene terephthalate fibres according to the dyeing Examples 5(a) and 6(a) in intense strongly greenish-blue shades of good fastness to sublimation, rubbing and washing.

c. Dyeings which are very similar to those of Examples 12(a) and 12(b) are obtained on triacetate and polyethylene terephthalate fibres, when the dyestuffs are mixed in other proportions within the limits of 20:80:20%.

Examples 13 a. Polyethylene terephthalate fibres are dyed with 5-amino(4'-fluoro-anilino)-quinizarin according to the HT process as in Example 5(a) in full greenish-blue shades of good fastness to light, sublimation and rubbing.

b. The 5-amino-8-(4'-fluoroanilino)-quinizarin was obtained as follows:

60 parts 5-amino-8-chloro-chloroquinizarin, 42 parts sodium acetate, 69 parts 4-fluoroaniline and 300 parts nitor-benzene are boiled under reflux for 20 hours. The reaction mixture is allowed to cool, the precipitated product is filtered off with suction, washed with 150 parts of nitrobenzene and subsequently with methanol, hot dilute hydrochloric acid and water. 56 parts 5-amino-8-(4'-fluoro-anilino)-quinizarin are obtained in the form of beautiful blue needles.

Example 14 a. A mixture of equal parts 5-amino-8-(p-chloroanilino)-quinizarin and 5-amino-8-(m-chloroanilino)-quinizarin dyes polyester fibres according to Example 5(a) and, above all 3(a), in an intense blue-green shade of very good fastness to light, washing, sublimation and rubbing. The fixation yields are very good. Compared with the dyeing obtained according to Example 11(a), the fastness to sublimation is even better.

The compounds used in Example 14(a) can be obtained according to the following instructions:

b. 5-amino-8-(p-chloroanilino)-quinizarin:

50 parts 5-amino-8-chloroquinizarin, 300 parts 4-chloro-aniline and 35 parts sodium acetate are stirred at 185° – 190°C. until only a small amount of starting material remains. Starting at 120°C., the mixture is slowly diluted with 300 parts by volume of ethanol, suction-filtered at 80°C., and washed with hot ethanol until the discharge is clear. The filtered material is then extracted by boiling with dilute hydrochloric acid, washed until neutral, and dried. 51.7 parts 5-amino-8-p-chloro-anilino-quinizarin are obtained in the form of needles with a violet lustre, which dissolve in concentrated sulphuric acid to give a solution with a dirty violet colour, in borosulphuric acid with a blue-green colour and in formaldehyde and sulphuric acid with a yellow-green colour.

c. 5-amino-8-(m-chloro-anilino)-quinizarin:

50 parts 5-amino-8-chloroquinizarin, 250 parts 3-chloro-aniline and 35 parts sodium acetate are stirred at 190°C. until only a small amount of starting material can be detected. The mixture is allowed to cool, covered with some 3-chloro-aniline and thoroughly washed with hot methanol and water. Yield 50.1 parts 5-amino-(m-chloroanilino)-quinizarin. The product dissolves in concentrated sulphuric acid to give a solution with a dirty violet colour in pyridine with a clear green-blue colour.

Example 15 a. Polyethylene terephthalate material is dyed with 5-hydroxyethylamino-8-(p-chloroanilino)-quinizarin according to the dyeing instruction given in Example 3(a) in clear, intense bluish-green shades of very good fastness to rubbing and sublimation.

b. The 5-hydroxyethylamino-8-(p-chloroanilino)-quinizarin is obtained according to the following instruction:

31 parts 5,8-dichloroquinizarin are heated with 15 parts sodium acetate and 12 parts hydroxyethylamine in 120 parts nitrobenzene at 135°C. until chromatography of a sample indicates the absence of starting material (about 70 minutes). The reaction mixture is then allowed to cool to 70°C., 100 parts methanol are added with stirring, the mixture is cooled to 0°C., the product filtered off with suction, washed with hot water and dried. 25.9 parts 5-hydroxyethylamino-8-chloro-quinizarin are obtained in the form of needles with a red metallic lustre.

34 parts of this product are heated with 30 parts sodium acetate and 100 parts p-chloroaniline at 180°C. for 30 hours, then mixed with 100 parts nitrobenzene while still hot. The mixture is then suction-filtered after cooling, and the filtrate washed with a little nitrobenzene and hot water. 24 parts 5-hydroxy-ethylamine-8-(p-chloroanilino)-quinizarin are obtained in the form of coarse needles with a metallic lustre.

Example 16 a. A polyethylene terephthalate fabric is printed according to Example 3(b) with 5-amino-8-(4'-methoxy-3'-chloroanilino)-quinizarin. A blue-green print of very good fastness to sublimation is obtained.

b. The product used in Example 16(a) for dyeing is obtained as follows:

50 parts 5-amino-8-chloroquinizarin, 200 parts 4-amino-2-chloro-anisole and 35 parts sodium acetate are stirred at 180°–185°C. for about 12 hours, the mixture is subsequently diluted with 200 parts by volume ethanol, the precipitated product is filtered off with suction at 75°C. and washed in the usual manner. 56 parts 5-amino-8-(p-methoxy-m-chloroanilino)-quinizarin are obtained. The product dissolves in pyridine to give a solution with a clear green-blue colour.

Example 17 a. 10 parts by weight of cellulose acetate skein material are dyed at 96°–98°C. for one hour in a bath previously adjusted to pH 5 with formic acid and containing 400 parts water, 0.2 part of the finely dispersed mixture of the dyestuffs 5-hydroxyethylamino-8-p-anisidino-quinizarin and 5-hydroxy-ethylamino-8-o-anisidinoquinizarin in the ration of 4:1, 3.4 parts of a mixture of o-, m-, p-cresotic acid methyl ester and 0.6 part of a mixture of equal parts of an aralkyl sulphonate and a non-ionic polyglycol ether. A clear green dyeing of good fastness properties is obtained.

b. The dyestuff mixture used in Example 17(a) dyes polyesters according to Example 6(a) and, above all, according to the dyeing instructions given in Examples 3(a) and 5(a), in green shades of good general fastness properties.

c. The dyestuff mixture used in Example 17(a) dyes polyamide according to the dyeing instruction given in Example 1(a) in very fast intense green shades.

If the pure components are used in Examples 17(a) – 17(c), instead of the mixtures, then weaker dyeings of a noticeably more bluish shade are obtained.

The compounds used in Examples 17(a) – 17(d) are obtained as follows:

e. 10 parts hydroxyethylamino-8-chloroquinizarin, obtained according to Example 15(b), are heated with 10 parts sodium acetate and 50 parts p-anisidine at 180°C. for 2 hours. After cooling to 60°C., adding 200 parts by volume methanol while stirring, filtering off with suction, washing with water and methanol, and drying, 10 parts 5-hydroxyethylamino-8-(p-anisidino).quinizarin are obtained in the firm of needles with a red lustre.

f. 10 parts 5-hydroxyethylamino-8-chloroquinizarin, obtained according to Example 15(b), are heated with 10 parts sodium acetate and 50 parts o-anisidine at 180°C. for 17 hours. After working up as in Example 17(e), 10 parts 5-hydroxyethylamino-8-(o-anisidino)-quinizarin are obtained.

Example 18 a. The product which can be obtained according to Paragraph (b) of the present Example dyes synthetic polyamide according to the dyeing instruction given in Example 1(a) in a bluishgreen shade of very good fastness to light.

b. 12 parts 5-hydroxyethylamino-8-chloroquinizarin, obtained according to Example 15(b), are heated with 12 parts sodium acetate and 55 parts p-amino-acetanilide in 25 parts nitrobenzene at 180°C. for 4 hours. After working up as in Example 17(e), 14.9 parts 5-hydroxyethylamino-8-(4'-acetamido-anilino)-quinizarin are obtained, contaminated with some 5-hydroxyethylamino-8-(4'-amino-anilino)-quinizarin.

Example 19 a. 0.1 part 5-hydroxyethylamino-8methylamino-quinizarin is pasted with 0.2 part of a 10% solution of Marseilles soap and made up with water at 50°C. to a volume of 300 parts with the addition of a further 6 parts of a solution of Marseilles soap. 10 parts acetate rayon are introduced into this bath, the temperature is raised to 75°C. within 20 minutes, the material is dyed at 75°C. for 1 hour, then rinsed with luke-warm water and dried. A clear, strongly greenish-blue dyeing is obtained.

b. The dyestuff used in Example 19 (a) is obtained as follows:

Methylamine is introduced into a solution of 10 parts 5-hydroxyethylamino-8-chloroquinizarin in 50 parts nitrobenzene, first at 120°to 130°C. for 20 minutes, then at 150°C. for one hour, and finally at 160°–170°C. for 1½hours. The reaction mixture is allowed to cool and clarified with characoal, and the filtrate diluted with a large volume of methanol and allowed to crystallise overnight. The product precipitated in the form of blue needles is filtered off with suction, washed with some methanol and dried. 5-hydroxyethylamino-8-methylamino-quinizarin is obtained.

Example 20 a. A mixture of 5-n-butylamino-8-methylamino-quinizarin and 5-i-butylamino-8-methylamino-quinizarin in the ratio of 1 : 2 dyes polyamide fabrics according to Example 1(a) in a clear blue shade of good fastness to light and satisfactory fastness to washing.

The compounds used in Example 20(a) for dyeing are obtained as follows:

b. 30 parts 5,8-dichloroquinizarin and 16 parts n-butylamine are stirred in 200 parts nitrobenzene at 150°–160°C. for about 40 minutes. Starting at 60°C., the reaction mixture is diluted with 200 parts methanol. The product, precipitated in the form of felted needles, is filtered off with suction when cold and washed with methanol and water. 26.8 parts 5-n-butylamino-8-chloroquinizarin are obtained in the form of brown-red needles with a metallic lustre, which dissolve in concentrated sulphuric acid with a bluish-red colour. On addition of boric acid, this solution exhibits a strong orange fluroescence.

If the same amount of isobutylamine is used, instead of n-butylamine, then 5-isobutylamino-8-chloroquinizarin is obtained in an analogous manner.

c. Methylamine is introduced into a solution of 5 parts 5-isobutylamino-8-chloro-quinizarin in 50 parts nitrobenzene at 145°–150°C. until only traces of starting material are indicated in a sample. The reaction mixture is allowed to cool, and diluted with 30 parts ethanol, then the precipitated reaction product is filtered off with suction at 30°C. and washed with methanol and water. 3.4 parts 5-isobutylamino-8-methylamino-quinizarin are obtained in the form of blue needles.

If 5-n-butylamino-8-chloroquinizarin is used, instead of 5-isobutylamino-8-chloroquinizarin, then 5-n-butylamino-8-methylamino-quinizarin is obtained in a similar manner.

Example 21 a. Polyamide fibres and acetate rayon are dyed according to the dyeing instructions of Example 1(a) or 19(a). with 5-amino-8-methylamino-quinizarin in clear blue shades.

b. The 5-amino-8-methylamino-quinizarin is obtained as follows:

Methylamine is introduced into a solution of 15 parts 5-amino-8-chloro-quinizarin in 100 parts nitrobenzene at 140°–145°C. for about 6½ hours. The reaction mixture is allowed to cool, and the reaction product, precipitated in the form of fine neeldes, is filtered off with suction and washed with methanol. 12 parts 5-amino-8-methylamino-quinizarin are obtained in the form of blue needles which dissolve in concentrated sulphuric acid to give a solution with a Bordeaux colour, and in borosulphuric acid with a green colour.

Example 22 a. When polyethylene terephthalate fibres are treated with 5-anilino-8-methylamino-quinizarin according to the dyeing instructions of Examples 3(a) and 5(a), very clear green dyeings of very good fastness to sublimation are obtained.

The 5-anilino-8-methylamino-quinizarin is obtained as follows:

150 parts 5,8-dichloroquinizarin, 120 parts sodium acetate and 450 parts aniline are stirred at 155°–160°C. until only a small amount of residual 5,8-dichloroquinizarin and, as yet not much 5,8-dianilino-quinizarin can be detected in a chromatographed sample (about 30 minutes). Starting at 80°C., the reaction mixture is diluted with 450 parts methanol, the precipitated product filtered off with suction at 60°C., washed with hot methanol, extracted by boiling with dilute hydrochloric acid, again filtered off with suction, and washed until neutral. 148 parts 5-anilino-8-chloro-quinizarin are obtained.

15 parts of the 5-anilino-8-chloroquinizarin so obtained are dissolved in 75 parts nitrobenzene and methylamine is introduced into the vigorously stirred solution until starting material is no longer present (about 3½ hours). The reaction mixture is diluted with 75 parts ethanol, suction-filtered at 75°C. and worked up as above. 11.9 parts 5-anilino-8-methylamino-quinizarin are obtained. The product dissolves in concentrated sulphuric acid to give a solution with a Bordeaux colour, turning yellow-green on addition of formaldehyde. The colour of the solution in borosulphuric acid is green.

Example 23 a. 5-p-toluidino-8-dimethylamino-quinizarin dyes polyamide according to Example 1(a) and polyethylene terephthalate fibres according to Examples 3(a) and 5(a) in clear green shades.

b. The 5-p-toluidino-8-dimethylamino-quinizarin can be obtained as follows:

40 parts 5,8-dichloroquinizarin and 40 parts sodium acetate are introduced into 120 parts molten p-toluidine, the mixture is rapidly heated to 160°–165°C. and stirred at this temperature until only traces of 5,8-dichloro-quinizarin are detected in a sample. The reaction mixture is allowed to cool while stirring and diluting with 100 parts ethanol, starting at 100°C. At 70°, the precipitated reaction product is filtered off with suction and washed with hot ethanol. The filter cake is then extracted by boiling with dilute hydrochloric acid, filtered off with suction, washed until neutral and dried. 43 parts 5-p-toluidino-8-chloroquinizarin of melting point 270°–273°C. are obtained in the form of brown-violet needles with a metallic lustre. The colour of the solution in concentrated sulphuric acid is violet, turning blue on addition of formaldehyde. The colour of the solution in dimethyl formamide is violet.

Dimethylamine is introduced at 120°C. with vigorous stirring into a solution of 8 parts of the 5-p-toluidino-8-chloroquinizarin so obtained in 40 parts nitrobenzene. The reaction mixture is stirred until cold, diluted with 80 parts methanol, and the precipitated reaction product is filtered off with suction. 6.2 parts 5-p-toluidino-8-dimethylamino-quinizarin are obtained. The product dissolves in concentrated sulphuric acid with a Bordeaux colour; the colour turns clear blue on addition of formaldehyde.

Example 24 a. Polyethylene terephthalate fibres are dyed with 5-p-toludino-8-methylamino-quinizarin accoding to the dyeing instructions of Examples 3(a), 5(a) and 6(a), in green shades fast to sublimation and rubbing and of medium fastness to light.

b. The product used in Example 24(a) is obtained as follows:

Methylamine is introduced into a solution of 10 parts 5-p-toluidino-8-chloroquinizarin in 100 parts nitrobenzene at 120° to 125°C. for 2 hours and then at 145°–150°C. for one hour. Starting at 60°C., the reaction mixture is diluted with 200 parts methanol and suction-filtered at 30°C. 8.7 parts 5-p-toluidino-8-methylamino-quinizarin are obtained in the form of long blue needles with a violet lustre, which dissolve in concentrated sulphuric acid to give a solution with a red colour turning yellow-green on addition of formaldehyde.

Example 25 a. The product obtained according to Paragraph (b) of the present Example dyes polyamide fabric according to the dyeing instruction given in Example 1(a) in a green shade.

b. 150 parts 5,8-dichloroquinizarin are dissolved in 500 parts nitrobenzene and methylamine is introduced into this solution with stirring at 140°–150°C. until only a small amount of starting material can be detected. The reaction mixture is stirred until cold, diluted with 3.75 parts ethanol, and the product filtered off with suction at 70°C. and washed with hot alcohol. 115 parts 5-methylamino-8-chloroquinizarin are obtained in the form of large blue needles with a greenish metallic lustre, which dissolve in concentrated sulphuric acid to give a solution wiht a clear bluish-red colour, and with an orange fluroescence on addition of boric acid. the flake colour is violet-red, and the colour of the solution in dimethyl formamide is red-violet.

20 parts of the 5-methylamino-8-chloroquinizarin so obtained, 14 parts sodium acetate, 100 parts p-amino-acetanilide and 100 parts nitrobenzene are stirred at 170°–175°C. for 2½ hours. The reaction mixture is diluted with 200 parts ethanol, and the product filtered off with suction at 80°C. and washed with ethanol, hot dilute hydrochloric acid and water. 17.4 parts 5-methylamino-8-(p-acetamino-anilino)-quinizarin are obtained in the form of black-blue needles with dissolve in concentrated sulphuric acid to give a solution with a dirty violet colour, and in borosulphuric acid with a clear yellowish-green colour.

Example 26 a. A polyester fabric is dyed with 5-amino-8-(p-tert.-butyl-anilino)-quinizarin according to the dyeing processes of Examples 3(a) and 5(a) in an intense green-blue shade fast to sublimation and light.

b. The 5-amino-8-(p-tert.butyl-anilino)-quinizarin can be obtained as follows:

25 parts 5-amino-8-chloroquinzarin, 17.5 parts sodium acetate and 125 parts p-tert. butyl-aniline are stirred at 175°–180°C. for 14 hours. Starting at 120°C., the mixture is diluted with 125 parts ethanol and the precipitated reaction product filtered off with suction at 50°C. and washed with warm ethanol, dilute hydrochloric acid and water. 26.9 parts 5-amino-8-(p-tert. butyl-anilino)-quinizarin are obtained. The product dissolves in concentrated sulphuric acid to give a solution with a violet colour, in borosuphuric acid with a bluish green colour, and in a mixture of sulphuric acid and formaldehyde with a yellow-green colour.

Example 27 a. 5-hydroxyethylamino-8-p-toluidino-quinizarin dyes the following fibres in bluish-green shades:
acetate rayon: according to dyeing Example 17(a)
triacetate: according to dyeing Example 3(c)
polyamide: according to dyeing Example 1(a) and
polyesters: according to dyeing Examples 5(a) and 3(a).

b. The 5-hydroxyethylamino-8-p-toluidino-quinizarin is obtained as follows:
10 parts 5-hydroxyethylamino-8-chloroquinizarin, obtained according to Example 15(b), are heated with 10 parts sodium acetate and 50 parts p-toluidine to 180°C. and kept at this temperature until the colour of the melt no longer changes. After cooling to 60°C., 50 parts methanol are added with stirring, and the product is filtered off with suction at 20°C. and washed with 70% aqueous methanol. The 5-hydroxyethyl-amino-8-p-toluidino-quinizarin is obtained in good yield.

Example 28 a. A fabric of polyethylene terephthalate fibres is treated according to the instructions of Example 3(a) with 5-anilino-8-o-anisidino-quinizarin. A full clear yellowish-green dyeing of very good fastness to sublimation is obtained. The good fixation yield can be still improved by carrying out the treatment with hot air at 210°C.

b. The 5-anilino-8-o-anisidino-quinizarin is obtained as follows:
40 parts 5-anilino-8-chloro-quinizarin, obtained according to Example 22(b), are stirred with the addition of 18 parts sodium acetate and 260 parts o-anisidine at 175°– 180°C. for 5 hours. Only traces of 5-anilino-8-chloro-quinizarin can then be detected by chromatography. Starting at 100°C., the mixture is diluted with 260 parts ethanol, and the precipitate product filtered off with suction at 70°C., washed with hot ethanol until clear and finally extracted by stirring with dilute hydrochloric acid while heating. 38 parts pure 5-anilino-8-o-anisidino-quinizarin are obtained.

Example 29

A polyethylene terephthalate fabric is treated according to the instruction of Example 3(a) with 5-p-toluidino-8-o-anisidino-quinizarin. A dyeing of very good fastness to sublimation and rubbing is obtained, which is even more yellowish-green than that of Example 24(a).

b. The 5-p-toluidino-8-o-anisidino-quinzarin is prepared as follows:
10 parts 5-p-toluidino-8-chloro-quinizarin, obtained as in Example 23 (b), 4.5 parts sodium acetate and 70 parts o-anisidine are stirred at 180°C. for 5 hours. Starting at 120°C. the reaction mixture is diluted with 70 parts ethanol, and suction-filtered at 80°C. The filter cake is washed with hot ethanol unitl the discharge is clear, extracted at 60°C. by stirring with hydrochloric acid, and washed until neutral. 10 parts 5-p-toluidino-8-o-anisidino-quinizarin are obtained.

Example 30 a. A polyethylene terephthalate fabric is dyed with 5-anilino-8-p-toluidino-quinizarin according to the dyeing instruction of Example 3(a) in a clear yellowish-green shade of good fastness to light and sublimation. Triacetate is dyed according to Example 3(c) in a very clear shade which, however, is appreciably more bluish.

b. The 5-anilino-8-p-toluidino-quinizarin is obtained as follows:
50 parts 5-anilino-8-chloro quinizarin, obtained according to Example 22(b), 10 parts sodium carbonate and 250 parts p-toluidine are stirred at 170°–180°C. for about 2½hours. Starting at 120°C. the melt is subsequently diluted with 250 parts diethyleneolycol-monomethyl ether and the reaction product, precipitated in the form of beautiful green-blue needles, is filtered off with suction at 80°C., and washed with some diethyleneglycol-monomethyl ether, then with boiling methanol and water. 52.6 parts pure 5-anilino-8-p-toluidino-quinizarin are obtained.

The same product is obtained, when 50 parts 5-p-toluidino-8-chloro-quinizarin, obtained as in Example 23(b), are stirred in an excess of aniline for 5 hours. Working up in the same manner yields 48.8 parts.

Example 31 a. A polyethylene terephthalate fabric is dyed with 5-p-toluidino-8-m-toluidino-quinizarin according to the dyeing instructions of Example 3(a) in a green shade fast to sublimation and light.

b. The 5-p-toluidino-8-m-toluidino-quinizarin can be obtained as follows:
20 parts p-toluidino-8-chloro-quinizarin, obtained according to Example 23(b), are stirred with 7.5 parts sodium carbonate and 100 parts m-toluidine at 190°–195°C. until only traces of starting material can be detected. The melt is allowed to cool down without stirring, and the precipitated reaction product filtered off with suction, washed with cold m-toluidine, and freed from the base by steam distillation. 16.7 parts 5-p-toluidino-8-m-toluidino-quinizarin are obtained.

Example 32 a. A fabric of polyethylene terephthalate fibres is treated according to the dyeing instructions of Example 3(a) with 5-m-chloro-anilino-8-p-chloroanilino-quinizarin. A bluish-green dyeing of very good fastness to light and sublimation is obtained with a satisfactory fixation yield. This is substantially improved when the heat setting is carried out at 210°C. instead of at 190°C.

The product used in Example 32(a) can be obtained as in Examples 32(b) or 32(c);

b. 20 parts 5,8-dichloroquinizarin and 20 parts sodium acetate are introduced into 100 parts molten p-chloroaniline and the mixture is stirred at 170°C. until only a small amount of dichloroquinizarin is detectable in a sample, The reaction mixture is diluted with 100 parts ethanol, and the product filtered off with suction at 80°C., washed with hot ethanol until the discharge is violet-coloured and clear, then extracted by boiling with dilute hydrochloric acid and washed until netural. 24 parts 5-(p-chloroanilino)-8-chloroquinizarin are obtained in the form of currant-coloured needles which dissolve in concentrated sulphuric acid to give a solution with a violet colour, and in borosulphuric acid with a green colour.

40 parts of this product, 15 parts sodium acetate and 160 parts 3-chloroaniline are stirred at 180°–185°C. for 24 hours. After this interval, only a small amount of starting material can be detected. The reaction mixture is diluted with 160 parts o-dichlorobenzene, the product is filtered off with suction at 50°C., and washed with o-dichlorobenzene until the washings are colourless. The solvent is driven off by means of steam with the addition of hydrochloric acid, the mixture filtered, and the filtrate washed until neutral. 35.8 parts 5-(p-chloroanilino)-8-(m-chloroanilino)-quinizarin are obtained.

c. 100 parts 5,8-dichloroquinizarin, 70 parts sodium acetate and 500 parts 3-chloroaniline are stirred at 185°–190°C. for 2 – 3 hours. The reaction mixture is then stirred until cold, and diluted with 200 parts o-dichlorobenzene. The product is filtered off with suction at 40°C., washed with hot methanol, extracted by boiling with dilute hydrochloric acid, filtered off with suction, washed until neutral, and dried. 81 parts 5-(3'-chloroanilino)-8-chloroquinizarin are obtained in the form of blue-violet needles which dissolve in sulphuric acid to give a solution with a violet colour, and in borosulphuric acid with a green colour.

20 parts of this product, 7.5 parts sodium acetate and 100 parts 4-chloroaniline are stired at 180°– 185°C. until starting material can no longer be detected. Starting at 120°C., the melt is diluted with 100 parts chlorobenzene. The precipitated product is filtered off with suction at 70°C., and washed with chlorobenzene, ethanol, dilute hyrochloric acid and water. 19.5 parts of a product identical with that in 32(b) are obtained.

Example 33 a. A fabric of polyethylene terephthalate is treated according to the dyeing instructions of Example 3(a) with
5-(m-chloroanilino)-8-(p-fluoroanilino)-quinizarin.
The dyeing obtained is very similar to that of Example 32(a) but has a somewhat more bluish shade.

b. The compound used in Example 33(a) is prepared as follows:

20 parts 5-(m-chloroanilino)-8-chloroquinizarin, obtained according to Example 32(c), 8 parts sodium acetate, 100 parts nitrobenzene and 15 parts p-fluoroaniline are boiled under reflux until only traces of starting material can be detected; this is the case after about 12 hours. The reaction mixture is then worked up according to Example 32(c), Paragraph 2, and 21.4 parts 5-(m-chloroanilino)-8-(p-fluoroanilino)-quinizarin are obtained in the form of felted needles.

Example 34 a. A fabric of polyethylene terephthalate is treated according to the dyeing instruction of Example 3(a) with 5-o-anisidino-8-p-anisidino-quinizarin. A clearly strongly yellowish-green dyeing of very good fastness to sublimation is obtained.

The 5-o-anisidino-8-p-anisidino-quinizarin can be obtained in an equally high quality by the methods 34(b) and 34(c):

b. 50 parts 5,8-dichloroquinizarin, 20 parts sodium acetate and 150 parts o-anisidine are stirred at 170°C. until the first amount of the di-reaction product formed by the double exchange of the chlorine atoms for o-anisidine can be detected by chromatography in a sample. Starting at 110°C., the melt is then slowly diluted with 150 parts enthanol. The precipitated reaction product is filtered off with suction at 80°C. and washed with hot ethanol until the washings are violet-coloured and clear. The filtered material is subsequently briefly boiled with dilute hydrochloric acid, filtered off with suction, washed until neutral and dried. 45.8 parts are obtained.

20 parts of the 5-o-anisidino-8-chloroquinizarin obtained above are stirred with 7 parts sodium acetate and 100 parts p-anisidine at 180°–70 185°c. until starting material can no longer be detected (about 3 hours). Starting at 100°C., the reaction mixture is then diluted with 100 parts ethyleneglycolmonomethyl ether, the product filtered off with suction at 60°C., washed successively with ethylene glycol monomethyl ether, methanol, dilute hydrochloric acid and water. After drying, 21.6 parts 5-o-anisidino-8-p-anisidino-quinizarin are obtained.

c. If 200 parts p-anisidine are used in Example 34(b), Paragraph 1, instead of 150 parts o-anisidine, and the process is otherwise carried out as described, then 48.8 parts 5-p-anisidino-8-chloroquinizarin are obtained.

When this product is reacted with o-anisidine in a manner similar to that described in Example 34(B), Paragraph 2, the same 5-o-anisidino-8-p-anisidino-quinizarin is obtained in a somewhat poorer yield.

Example 35 a. When a polyethylene terephthalate fabric is treated according to the dyeing instruction of Example 3(a) with the following substances:

a. o-phenetidino-p-phenetidino-quinizarin
b. o-phenetidino-m-phenetidino-quinizarin,
c. m-phenetidino-p-phenetidino-quinizarin, but the treatment with hot air is carried out at 210°C., yellowish-green dyeings of very good fastness to sublimation are obtained. Very similar dyeings are obtained by replacing part of the phenetidines by o- or p-anisidines in the above Examples.

b. These compounds can easily be obtained with good to very good yields by methods similar to those described in Examples 34(b) and 34(c).

Example 36 a. A polyethylene terephthalate fabric is thermosolised with 5-p-anisidino-8-p-toluidino-quinizarin as in Example 3(a), but at 210°C. Clear yellowish-green dyeings of good fastness to light and sublimation are obtained.

A very similar dyeing is obtained when the products obtained as in Example 36(c) or 36(d) are used.

b. 60 parts 5-p-anisidino-8-chloroquinizarin, obtained according to Example 34(c), are stirred with 40 parts sodium acetate and 180 parts p-toluidine at 175°–180°C. for 6 hours. Starting at 150°C., the melt is slowly diluted with 220 parts diethyleneglycol ether. The reaction product, precipitated in the form of large blue-black needles, is then filtered off with suction, and washed with hot methanol, dilute hydrochloric acid and water. 66.2 parts of product are obtained.

c. 60 parts 5,8-dichloroquinizarin, 40 parts sodium acetate, 100 parts p-anisidine and 200 parts p-toluidine are stirred at 175°– 180°C. After the reaction has proceeded for about 1 hour, starting material and one-sided reaction products are no longer present in the mixture. The melt is then diluted with 300 parts diethylene glycol monomethyl ether, and suction-filtered at 50°–60°C. The filtered material is washed in succession with diethyleneglycol-monomethyl ether, ethanol, water, and dilute hydrochloric acid, and then again with water. After drying, there are obtained 71.3 parts of a product which is shown by chromatography to consist of about 50 –60% 5-p-toluidino-8-p-anisidino-quinizarin and 20 – 25% each of 5,8-di-p-toluidino-quinizarin and 5,8-di-p-anisidino-quinizarin.

d. 60 parts dichloroquinizarin, 40 parts sodium acetate, 36 parts p-anisidine and 200 parts p-toluidine are stirred at 175°–180°C. for 2½hours, then the melt is diluted with 300 parts diethyleneglycol-monomethyl ether and worked up as in Example 36(c). 78.2 parts of a product are obtained, which is shown by chromatography to consist of about 50% 5-p-toluidino-8-p-anisidino-quinizarin, about 40% 5,8-di-p-anisidino-quinizarin and about 10% 5,8-di-p-toluidino-quinizarin.

By varying the molar composition of the amine mixture, the proportion in which the two reaction products symmetrical with regard to the amino substituents are formed can be varied to almost any extent desired, whereas the amount of asymmetrical reaction product does not change appreciably.

Example 37 a. A fabric of polyethylene terephthalate fibres is thermosolised with 5-(m-chloro-p-methoxy-anilino)-8-m-toluidinoquinizarin as in Example 3(a), but at 210°C. A green dyeing of very good fastness to sublimation is obtained.

b. The 5-(m-chloro-p-methoxy-anilino)-8-m-toluidino-quinizarin was prepared as follows:

100 parts 5,8-dichloroquinizarin, 75 parts sodium acetate and 500 parts 4-amino-2-chloro-anisole are stirred at 120°C. until some di-reaction product can clearly be detected by chromatography, (about 20 minutes). Starting at 100°C., the reaction mixture is diluted with 500 parts o-dichlorobenzene, suction-filtered at 40°C., washed with o-dichlorobenzene, the filter cake is extracted by boiling with dilute hydrochloric acid, filtered off with suction and washed until neutral. 66 parts 5-(3-chloro-4-methoxy)-anilino-8-chloroquinizarin are obtained in the form of a violet crystalline powder which dissolves in concentrated sulphuric acid to give a solution with a bluish-red colour, turining dark blue on addition of formaldehyde. The colour of the solution in borosulphuric acid is greenish-blue.

c. 50 parts of this product are stirred with 250 parts m-toluidine with the addition of 20 parts sodium acetate at 190°C. until starting material can no longer be detected. The melt is then diluted with 150 parts diethyleneglycol-monomethyl ether, the precipitated reaction product is filtered off with suction at 60°C. and washed in succession with diglycol ether, methanol and water. The filtered material is finally extracted by boiling with N-sulphuric acid, filtered off with suction washed until neutral and dried. 51 parts 5-(m-chloro-p-methoxyanilino)-8-m-toluidino-quinizarin are obtained.

Example 38 a. When a polyethylene terephthalate fabric is treated according to the dyeing instruction of Example 3(a) with 5-(2,6,-dimethylanilino)-8-(3,5-dimethylanilino)-quinizarin, a green-blue dyeing of good fastness to sublimation and rubbing is obtained.

Very similar dyeings are obtained, when the following products are used, instead of 5-(2,6-dimethyl-anilino)-8-(3,5-dimethylanilino)-quinizarin:

5-(2,4,6-trimethylanilino)-8-(3,5-dimethylanilino)-quinizarin,
5-(2,6-diethyl-41methylanilino0-8-(3,5-dimethylanilino)-quinizarin
5-(2,4,6-trimethylanilino)-8-(3,4-dimethylanilino)-quinizarin,
5-(2,6-dimethylanilino)-8-(3,4-dimethylanilino)-quinizarin.

The compounds used in Example 38(a) can be obtained, for example, as follows:

b. 50 parts 5,8-dichloroquinizarin, 20 parts sodium acetate and 250 parts 1-amino-2,6-dimethylbenzene are stirred at 200°–210°C. until the first amount of bis-reaction product formed by the exchange of both chlorine atoms for 1-amino-2,6-dimethyl-benzene can be detected in a sample. The reaction mixture is then slowly diluted with 250 parts alcohol, and the 5-(2,6-dimethyl-anilino)-8-chloroquinizarin, precipitated in the form red-brown needles, filtered off with suction and washed in succession with alcohol, hydrochloric acid and water. 40.2 parts are obtained.

c. If equivalent amounts of 1-amino-2,4,6-trimethyl-benzene or 1-amino-2,6-diethyl-4-methylbenzene are used in Example 38(b), instead of 1-amino-2,6-dimethylbenzene, then 5-(2,4,6-trimethylanilino)-8-chloroquinizarin and 5-(2,6-diethyl-4-methylanilino)-8-chloroquinizarin, respectively, are obtained in the same manner.

d. 20 parts of the product obtained according to 38(b) are stirred with 9 parts sodium acetate and 100 parts 3,5-dimethylaniline at 175°–180°C. until starting material can no longer be detected. The reaction mixture is allowed to cool down, diluted with 160 parts chlorobenzene, the product precipitated in the form of blue-green needles is filtered off with suction, washed with chlorobenzene, freed from the solvent with steam, and dried. 21.1 parts 5-(2,6-dimethylanilino)-8-(3,5-dimethylanilino)-quinizarin are obtained.

e. If the same amount of 3,4-dimethylaniline is used in Example 38(d), instead of 3,5-dimethylaniline, then 5-(2,6-dimethylanilino)-8-(3,4-dimethylanilino)-quinizarin is obtained, likewise in good yield.

Example 39 e. When a polyethylene terephthalate fabric is dyed as in Example 3(a) with the product obtained according to Paragraph (b) of the present Example, a clear, full green dyeing of very good fastness to sublimation is obtained.

b. 60 parts 5,8-dichloroquinizarin, 40 parts sodium acetate, 25 parts aniline and 200 parts nitrobenzene are stirred at 200°–205°C. for 3 hours. Besides 90% 5-anilino-8-chloroquinizarin, the product then contains about 5% each of 5,8-dichloroquinizarin and 5,8-dianilino-quinizarin. 75 parts p-anisidine are then added to the reaction mixture, which is stirred at 195°–200°C. for a further 3hours. Starting at 140°C., the reaction mixture is then diluted with 150 parts diethyleneglycol ether, suction-filtered at 70°C., and the filtered material washed with diglycol ether, methanol, dilute hydrochloric acid and water. 66.7 parts of a well crystallized product are obtained, which consists of 90% 5-anilino-8-p-anisidino-quinizarin and 5% each of 5,8-dianilino-quinizarin and 5,8-di-p-anisidino-quinizarin. These three compounds can very easily be separated from one another by the methods of thin layer chromatography.

Example 40 a. A polyethylene terephthalate fabric is treated with the product obtained as in Paragraph (b) of the present Example, following the dyeing instruction of Example 3(a). A green dyeing is obtained, which is very similar to that of Example 39(a) and has comparable fastness properties.

b. 60 parts 5,8-dichloroquinizarin, 40 parts sodium acetate and 30 parts o-toluidine are stirred with 240 parts nitrobenzene at 195°– 200°C. for 2 hours, a further 25 parts o-toluidine are then added and stirring is continued at 195°– 200°C. for a further 3 hours. Chromatography of a sample indicates about 6% starting material and already about 4% di-o-toluidino-quinizarin. 100 parts p-anisidine are then added to the melt, which is stirred at 205° until unitl mono-reaction products of 5,8-dichloroquinizarin can no longer be detected (about 4 – 5 hours). The melt is worked up as in Example 39(b). 55 parts of a product are obtained, which consists of about 90% 5-o-toluidino-8-p-anisidinoquinizarin and about 5% each of di-p-anisidino-quinizarin and di-o-toluidino-quinizarin. The compounds also can be separated very easily by thin layer chormatography.

Example 41 a. A fabric of polyethylene terephthalate fibres is treated with the dyestuff mixture obtainable according to Paragraph (b) of the present Example following the instruction of Example 3(a), but thermosolising at 210°C. A green dyeing of good fastness to light, rubbing and sublimation is obtained.

b. 60 parts 5,8-dichloroquinizarin, 40 parts sodium acetate, 25 parts p-toluidine and 300 parts p-chloroaniline are stirred at 180°– 185°C. for 18 hours. The reaction mixture is diluted with 200 parts diethylene glycol monomethyl ether, then suction-filtered at 70°C. The filtered material is washed with diethylene glycol ether, ethanol, dilute hydrochloric acid and water. 66 parts of a mixture are obtained, which consists of about 70% 5-p-toluidino-8-(p-chloroanilino)-quinizarin and about 15% each of 5,8-di-p-toluidino-quinizarin and 5,8-di-(p-chloroanilino)-quinizarin. These products can easily be detected side by side using thin layer chromatography.

Example 42 a. A fabric of polyethylene terephthalate fibres is treated with the dyestuff mixture obtainable according to Paragraph (b) of the present Example following the instruction of Example 3(a). An intense green dyeing of good fastness to light, rubbing and sublimation is obtained.

b. 60 parts 5,8-dichloroquinizarin, 40 parts sodium acetate, 23.5 parts aniline and 300 parts p-chloroaniline are stirred at 180°– 185°C. for 18 hours. The mixture is worked up as described in Example 41(b) and 71.8 parts of a mixture are obtained, which consists of about 70% 5-anilino-8-(p-chloroanilino)-quinizarin, about 20% 5,8-di-anilino-quinizarin and about 10% 5,8-di-(p-chloroanilino)-quinizarin. Also these compounds can easily be detected side by side by chromatography.

Example 43 a. A fabric of polyethylene terephthalate fibres is dyed with 5,8-dianilino-quinizarin as in Example 3(a), but treated with hot air at 210°C. A clear green dyeing is obtained, which is characterised by good fastness to light, thermofixing, washing and rubbing. The fixation yield is almost quantitative.

b. When a triacetate fabric is treated with 5,8-dianilinoquinizarin as in Example 3(a), an intense, very clear green dyeing is likewise obtained, the shade of which however, is appreciably more bluish.

c. The dianilino-quinizarin used in Examples 43(a) and 43(b) is obtained as follows:

150 parts 5,8-dichloroquinizarin, obtained according to Example 7 of British Patent Application No. 34075/64, 120 parts sodium acetate and 450 parts aniline are stirred at 165 – 170°C. until no starting material and no 5-anilino-8-chloroquinizarin can be detected in a sample. This is the case after about 10 hours. Starting at 160°C., the reaction mixture is slowly diluted with 450 parts o-dichlorobenzene, suction-filtered, washed, and the solvent driven off with steam. The product is filtered off with suction and dried. 167 parts pure 5,8-di-anilino-quinizarin are obtained.

Example 44 a. A fabric of polyethylene terephthalate fibres is dyed according to Example 3(a) with a liquor containing, per litre, 20 g 5,8-di-m-toluidino-quinizarin is finely dispersed form. A clear green dyeing of good fastness to rubbing, sublimation and washing is obtained.

b. The 5,8-di-m-toluidino-quinizarin is obtained as follows:

100 parts 100 parts 5,8-dichloroquinizarin, 100 parts sodium acetate and 300 parts m-toludine are stirred at 180°– 185°C. for about 12 hours and, after dilution with 300 parts diethylene glycol monomethyl ether, worked up at 75°C. as in Example 34(b). 105 parts pure 5,8-di-m-toluidino-quinizarin are obtained.

Example 45 a. If the same amount of di-o-toluidino-quinizarin is used in Example 44(a) instead of 5,8-di-m-toluidino-quinizarin, then a somewhat more bluish-green dyeing is obtained which has similarly good fastness to sublimation.

b. The di-o-toluidino-quinizarin used in Example 45(a) is obtained in a similar way to the product obtained in Example 44(b). However, the conversion proceeds substantially more slowly, so that the reaction is terminated only after about 24 hours.

Example 46

A fabric of polyethylene terephthalate fibres is dyed according to Example 3(a) with a liquor containing, per litre, 20 g of a mixture of equal parts 5,8-di-o-toluidino-quinizarin and 5,8-di-p-toluidino-quinizarin. A full, clear yellowish-green dyeing of very good fastness to sublimation is obtained with a good fixation yield. This dyeing is fuller than dyeings obtained in the same way with the pure components.

Example 47 a. A fabric of polyethylene terephthalate fibres is dyed according to Example 3(a) with a liquor containing, per litre, 20 g 5,8-di-(p-tert.-butylamino-anilino)-quinizarin. A strongly yellowish-green dyeing of good fastness to light and very good fastness to sublimation is obtained.

b. The 5,8-di-(p-tert.butylamino-anilino)-quinizarin is obtained according to the following instruction:

35 parts 5,8-dichloroquinizarin, obtained according to Example 7 of British Patent Application No. 34075/64, 175 parts p-tert.butyl-aniline in 14 parts sodium carbonate are stirred at 175°C. for 5 hours. The reaction mixture is slowly diluted with 175 parts methanol, starting at 95°C., and a stirring is continued at 65°-70°C. for some time. About 20 parts water are then added dropwise, the mixture is suction-filtered at 65°-70°C., washed with boiling hot methanol, and the filtered material extracted by boiling with dilute hydrochloric acid, filtered off with suction, washed until neutral and dried. 43 parts are obtained.

Example 48 a. A fabric of polyethylene terephthalate fibres is dyed according to Example 3(a) with a mixture consisting of 60% 5,8-di-p-anisidino-quinizarin and 40% 5,8-di-o-anisidinoquinizarin. A clear yellowish-green dyeing of very good fastness to sublimation is obtained. This dyeing is substantially fuller than dyeings obtained in the same way with the pure components.

The compounds used in Example 48(a) can be obtained as follows:

b. 100 parts 5,8-dichloroquinizarin, 100 parts sodium acetate and 300 parts o-anisidine are stirred at 180°-185°C. for 13 hours. The reaction mixture is then diluted with 450 parts diglycol ether and the product, precipitated in the form of blue needles, is filtered off with suction, washed in succession with diglycol ether, water, dilute hydrochloric acid and again with water, and dried. 115.8 parts 5,8-di-o-anisidino-quinizarin are obtained.

c. 100 parts 5,8-dichloro-quinizarin, 100 parts sodium acetate and 400 parts p-anisidine are stirred at 175°- 180°C. for 2½ hours and, after dilution with 500 parts diethylene glycol ether, worked as as in Example 48(b). 120.7 parts 5,8-di-p-anisidino-quinizarin are obtained.

Example 49 a. A dyeing very similar to that of Example 48(a) is obtained when the mixture prepared according to Paragraph (b) of the present Example is used for dyeing according to Example 3(a).

b. 100 parts 5,8-dichloroquinizarin, 300 parts o-anisidine, 100 parts p-anisidine and 80 parts sodium acetate are stirred at 180°- 185°C. until only traces of the asymmetric reaction product formed by the monohalogen exchange can be detected in a sample. Working up is then carried out as described in Example 48(b). 109.8 parts of a well-crystallised mixture are obtained, which consists of 5-(o-anisidino)-8-(p-anisidino)- quinizarin and the two products substituted symmetrically with regard to the amine.

Example 50 a. When a polyethylene terephthalate fabric is treated with the corresponding phenetidine derivatives instead of with the anisidine derivatives used in Examples 48(a) and 49(a), very similar dyeings are obtained which have a somewhat more yellowish shade, but usually have a lower colour strength.

b. The 5,8-di-phenetidino-quinizarins are obtained, for example, as follows:

75 parts 5,8-dichloroquinizarin are reacted in separate batches with 225 parts of each o-, m- and p-phenetidine at 180°- 185°C. with the addition to each bath of 50 parts sodium acetate. When the reaction is completed, each of the melts is diluted with 400 parts diethylene glycol monomethyl ether, suction-filtered at 75°C. and subjected to the usual washing operation. There are obtained:

94 parts 5,8-di-p-phenetidino-quinizarin (reaction time 2 hours)
94 parts 5,8-di-m-phenetidino-quinizarin (reaction time 3 hours)
92 parts 5,8-di-o-phenetidino-quinizarin (reaction time 24 hours)

Example 51 a. A polethylene terephthalate fabric is thermosolised with a mixture of equal parts of 5,8-di-(m-chloroanilino)-and 5,8-di-(p-chloroanilino)-quinizarin according to dyeing Example 3(a). A somewhat bluish-green dyeing of good fastness to light and very good fastness to sublimation is obtained. The fixation yield can be improved by a treatment with hot air at 210°C.

The compounds used in Example 51(a) are obtained as follows:

b. 40 parts 5-(p-chloroanilino)-8-chloroquinizarin, obtained according to Example 32(b), 15 parts sodium acetate and 200 parts p-chloroaniline are stirred at 180°- 185°C. for 13 hours. Starting at 120°C., the mixture is slowly diluted with 200 parts o-dichlorobenzene, suction-filtered at 80°C. The filtered material is washed, starting at 80°C., with about 300 parts o-dichlorobenzene until the washings are clear, and freed from the solvent by steam distillation. 39.3 parts 5,8-di(p-chloroanilino)-quinizarin are obtained.

c. 20 parts 5-(m-chloroanilino)-8-chloroquinizarin, obtained according to Example 32(c), are stirred, after the addition of 7 parts sodium acetate, with 100 parts 3-chloroaniline at 180°- 185°C. for 12 hours and then at 220°- 225°C. for 6 hours. The reaction mixture is diluted with 150 parts nitrobenzene. The product, precipitated in the form of needles, is filtered off with suction at 80°C., washed with plenty of warm nitrobenzene, and the filtered material distilled with steam. It is then treated with hot hydrochloric acid, filtered off with suction, washes until neutral and dried. 19.3 parts 5,8-di-(m-chloroanilino)-quinizarin are obtained.

Example 52 a. A fabric of polyethylene terephthalate fibres is thermosolised according to Example 3(a) at 210°C. with a liquor containing, per litre, 20 g, 5,8-di-(p-fluoroanilino)-quinizarin. A green dyeing is obtained with a somehat more bluish-shade than that of the dyeing obtained in Example 51(a).

b. The 5,8-di-(p-fluoroanilino)-quinizarin can be obtained according to the following instruction:

75 parts 5,8-dichloroquinizarin, 50 parts sodium acetate, 125 parts p-fluoroaniline and 375 parts nitrobenzene are stirred at 210°- 215°C. for 14 hours. The reaction mixture is diluted with 300 parts diethylene glycol ether, suction-filtered at 70°C. and worked up in the usual manner. 93 parts of the pure product are obtained.

Example 53 a. A fabric of polyethylene terephthalate fibres is thermosolised according to Example 3(a) at 220°C. with 5,8-di-(m-chloro-p-methoxy-anilino)-quinizarin. A green dyeing of good fastness to light and sublimation is obtained. When thermosolising is carried out at 190°C., only a relatively weak dyeing is obtained.

b. The 5,8-di-(m-chloro-p-methoxy-anilino)-quinizarin is obtained as follows:

40 parts 5,8-dichloroquinizarin, 200 parts 4-amino-2-chloroanisole and 30 parts sodium acetate are stirred at 185°–190°C. for 5 hours. Initially at 120°C., the melt is then diluted with 200 parts ethanol. The product is filtered off with suction at 75°C., washed with hot ethanol until clear, and the filtered material worked up in the usual manner. 66 parts are obtained in the form of blue felted needles.

Example 54 a. A fabric of polyethylene terephthalate fibres is treated according to Example 3(a) with 5,8-di-(m-methoxy-p-methylanilino). quinizarin. A green dyeing of very good fastness to sublimation and medium fastness to rubbing is obtained. The fastness to rubbing can be improved by a reductive after-treatment as described in Example 3(a).

b. The compound used in Example 54(a) can be obtained as follows:

75 parts 5,8-dichloroquinizarin, obtained according to Example 7 of German Application F 40 552 IVb/1-2qu (Le A 8300), 50 parts sodium acetate and 225 parts 4-amino-2-methoxy-1methylbenzene are stirred at 180°C. for 6 hours. The mixture is diluted with 200 parts diethyleneglycol ether, suction-filtered at 75°C., and the filtered material worked up in the usual manner. 88 parts are obtained.

Example 55 a. A fabric of polyethylene terephthalate fibres is treated according to Example 3(a) with 5,8-di(2,6-dimethylanilino) quinizarin. A blue dyeing of good fastness to sublimation is obtained.

b. The 5,8-di-(2,6-dimethylanilino)-quinizarin is obtained as follows:

50 parts 5,8-dichloroquinizarin, 250 parts 2,6-dimethylaniline and 40 parts sodium acetate are stirred at 220°–225°C. for 36 hours. The reaction mixture is stirred until cold, then suction-filtered, and the filtered material washed with 50 parts of the 2,6-dimethylaniline, 100 parts chlorobenzene, methanol and water. The filtered material is finally extracted by boiling with dilute hydrochloric acid, filtered off with suction, washed until neutral and dried. 38.5 parts are obtained in pure form.

Example 56

A fabric of polyethylene terephthalate fibres is treated according to Example 3(a) with a mixture of 60% 5-amino-8-(p-chloroanilino)-quinizarin of Example 14(b) and 40% 5,8-di-(p-chloroanilino)-quinizarin of Example 51(b). A full turquoise-blue dyeing of good fastness to light and sublimation is obtained.

Example 57 a. Polyethylene terephthalate fibres are treated according to the dyeing instruction of Example 3(a) with 5-methylamino-8-p-toluene-sulphamido-quinizarin. A neutral blue dyeing of good fastness to sublimation is obtained.

b. The compound used for dyeing is obtained as follows:

A mixture of 75.9 parts 5-methylamino-8-chloroquinizarin (obtained according to Example 25(b)), 95 parts p-toluene sulphamide, 38 parts potassium carbonate, 1.5 parts copper acetate, 0.5 part copper powder and 550 parts nitrobenzene is heated to 150°C. and kept at this temperature for 2 hours. When the reaction is completed, the reaction mixture is allowed to cool and dilute at 80°C. with 275 parts methanol. The reaction mixture is allowed to cool still further, and the well-crystallised reaction product filtered off with suction and washed with methanol. The filtered material is extracted by boiling with acid and dried. The 5-methylamino-8-p-toluene sulphamide-quinizarin is obtained in a yield of 72%. The compound dissolves in concentrated sulphuric acid to give a solution with a red colour. The colour of the solution in borosulphuric acid is initially reddish-blue, but soon turns red-violet.

Example 58 a. Polyethylene terephthalate fibres are treated according to the dyeing instruction of Example 3(a) with 5-amino-8-p-toluene-sulphamido-quinizarin. A blue dyeing of good fastness to sublimation is obtained.

b. A mixture of 14.5 parts 5-amino-8-chloroquinizarin, obtained according to Example 1(b), 19 parts p-toluene-sulphamide, 7.6 parts potassium carbonate, 0.3 parts copper acetate and 0.1 parts copper powder is heated in 110 parts nitrobenzene at 150°C. for 3 hours. 55 parts methanol are added at 80°C., the mixture is suction-filtered when cold and washed with methanol until the washings are clear blue. The filter residue is brought to the boil with 200 parts water, acidified with hydrochloric acid, and washed with hot water until neutral. After drying, 17.5 parts 5-amino-8-p-toluene-sulphamido-quinizarin are obtained in the form of blue-violet prisms.

Example 59 a. Fabrics of polyethylene terephthalate fibres are treated according to the dyeing instructions of Examples 3(a) and 5(a) with 5-methylamino-8-phenylmercapto-quinizarin. Blue dyeings of very good fastness to rubbing and sublimation are obtained.

b. The 5-methylamino-8-phenylmercapto-quinizarin is obtained as follows:

6 parts 5-methylamino-8-chloroquinizarin, obtained as in Example 25(b), are dissolved in 100 parts dimethyl formamide, and a solution of 4.25 parts thiophenol in 35 parts ethanol and 3.5 parts potassium hydroxide is added dropwise to this solution at 80°C. over a period of 30 minutes. Heating is continued at 80°C. for a further 30 minutes, 5 parts acetic acid are added, the mixture is diluted with 100 parts methanol, suction-filtered at 40°C. and washed with methanol and water. 7 parts 5-methyl-amino-8-phenylmercapto-quinizarin are obtained in the form of violet shiny needles, which dissolve in concentrated sulphuric acid to give a blue solution turning olive-green on addition of formaldehyde.

The products listed in the following Table are obtained as in Example 59(b) when the reaction components of Columns 4 and 5 of the Table are used in the stoichiometric amounts corresponding to this Example. When these compounds are used to dye polyethylene terephthalate materials with the methods of the Examples referred to in column 2, the shades and fastness properties given in column 3 are obtained. In Column 6 of this Table 1. denotes the colour of the solution in concentrated sulphuric acid,
2. denotes the colour of the solution in borosulphuric acid and
3. denotes the colour of the solution in a mixture of concentrated sulphuric acid and paraformaldehyde.

Table

| Example | Column 1 Structure of dyestuff | Column 2 Dyeing according to Example | Column 3 Shade and fastness properties | Column 4 Component with reactive H-atom | Column 5 Anthraquinone component | Column 6 Physical and chemical properties of dyestuff and yield |
|---|---|---|---|---|---|---|
| 60 | anthraquinone with OH, O, NH$_2$ / OH, O, S-phenyl | 3(a) 5(a) 6(a) | polyester red-violet. Good fastness to rubbing, light and sublimation | phenyl-SH | anthraquinone with OH, O, NH$_2$ / OH, O, Cl | Yield 82% theoretical Brown needles (1) cornflower blue (2) grey-blue (3) dirty green |
| 61 | anthraquinone with OH, O, N(CH$_3$)$_2$ / OH, O, S-phenyl | 3(a) 5(a) 6(a) | Polyester strongly green-blue. Good fastness to rubbing, light and sublimation | phenyl-SH | anthraquinone with OH, O, N(CH$_3$)$_2$ / OH, O, Cl | Yield 62% theoretical Blue platelets with red metal lustre (1) deep blue (2) blue-green soluble in dilute acid to give orange-red solution |
| 62 | anthraquinone with OH, O, NH-CH$_2$-CH$_2$-OH / OH, O, S-phenyl | 3(a) 5(a) | Polyester clear neutral blue. Good fastness to sublimation | -SH | anthraquinone with OH, O, NH-CH$_2$-CH$_2$-OH / OH, O, Cl | Yield 84% theoretical Blue needles (1) blue (2) olive-green (3) yellow-green |
| 63 | anthraquinone with OH, O, NH$_2$ / OH, O, S-phenyl-CH$_3$ | 3(a) 5(a) | Polyester bluish-violet. Very good fastness to sublimation and rubbing | H$_3$C-phenyl-SH | anthraquinone with OH, O, NH$_2$ / OH, O, Cl | Yield 87% theoretical. Violet needles with metallic lustre (1) greenish-blue (2) grey-blue (3) green-blue |
| 64 | anthraquinone with OH, O, NH$_2$ / OH, O, S-phenyl-CH$_3$ | 3(a) 5(a) 6(a) | Polyester strongly violet. Good fastness to light, rubbing and sublimation | H$_3$C-phenyl-SH | anthraquinone with OH, O, NH$_2$ / OH, O, Cl | Yield 90% theoretical Blue-violet needles with metallic lustre (1) blue (3) yellowish green |
| 65 | anthraquinone with OH, O, NH$_2$ / OH, O, S-phenyl-CH$_3$ | 3(a) 5(a) 6(a) | Polyester strongly violet. Good fastness to light and sublimation | CH$_3$-phenyl-SH | anthraquinone with OH, O, NH$_2$ / OH, O, Cl | Yield 66% of theory Blue needles with metallic lustre (1) deep blue (3) yellow-green |
| 66 | anthraquinone with OH, O, NH$_2$ / OH, O, S-CH$_2$-CH$_2$-OH | 3(a) 5(a) | Polyester violet. Good fastness to rubbing and sublimation | HO-CH$_2$-CH$_2$-SH | anthraquinone with OH, O, NH$_2$ / OH, O, Cl | Yield 71% theoretical Shiny violet needles (1) blue (2) greenish-blue |
| 67 | anthraquinone with OH, O, NH-CH$_3$ / OH, O, S-phenyl-CH$_3$ | 3(a) 5(a) | Polyester greenish-blue. Very good fastness to sublimation | H$_3$C-phenyl-SH | anthraquinone with OH, O, NH-CH$_3$ / OH, O, Cl | Yield 94% theoretical Violet needles with red metal lustre (1) blue (2) grey-blue (3) khaki |
| 68 | anthraquinone with OH, O, NH-CH$_3$ / OH, O, S-phenyl-CH$_3$ | 3(a) 5(a) 6(a) | Polyester strongly greenish-blue. Good fastness to sublimation and rubbing | H$_3$C-phenyl-SH | anthraquinone with OH, O, NH-CH$_3$ / OH, O, Cl | Yield 93% theoretical Blue needles with red metal lustre (1) reddish-blue (3) greenish-khaki |
| 69 | anthraquinone with OH, O, NH-CH$_3$ / OH, O, S-phenyl-CH$_3$ | 3(a) 5(a) | Polyester strongly greenish-blue. Very good fastness to sublimation | CH$_3$-phenyl-SH | anthraquinone with OH, O, NH-CH$_3$ / OH, O, Cl | Yield 93% theoretical Blue felted needles (1) reddish blue (2) bluish green (3) yellow-green |
| 70 | anthraquinone with OH, O, NH-CH$_3$ / OH, O, S-CH$_2$-CH$_2$-OH | 3(a) 5(a) | Polyester greenish-blue. Good fastness to rubbing and sublimation | HO-CH$_2$-CH$_2$-SH | anthraquinone with OH, O, NH-CH$_3$ / OH, O, Cl | Yield 96.5% theoretical. Blue needles (1) violet (2) greyish blue (3) olive-green |
| 71 | anthraquinone with OH, O, NH$_2$ / OH, O, S-phenyl-Cl | 3(a) | Polyester bluish-violet. Very good fastness to light and sublimation | Cl-phenyl-SH | anthraquinone with OH, O, NH$_2$ / OH, O, Cl | Yield 94% theoretical Needles with metallic lustre (1) blue (2) blue-green (3) olive-green |

Example 72

When equal parts of 5-amino-8-(p- or m-methyl-phenylmercapto)-quinizarin, obtained according to Examples 63 and 64, and 5-methylamino-8-(o-methyl-phenylmercapto)-quinizarin, obtained according to Example 69, are mixed, intense navy-blue shades are obtained on polyester fibres according to the dyeing instructions of Examples 3(a) and 5(a).

Example 73

When equal parts of 5-amino-8-(o-methyl-phenylmercapto)-quinizarin of Example 65 and 1,5-dihydroxy-4,8-diamino-3-anisyl-anthraquinone, obtained according to Example 6(a) of Belgian Patent Specification No. 627,010, are mixed, intense dark blue dyeings which are fast to sublimation, rubbing, washing and light are obtained on polyester fibres according to the carrier process [Example 6(a)], the HT process [Example 5(a)]the thermosol process [Example 3(a)]

Very similar dyeings of almost the same fastness properties are obtained, when 5-amino-8-(o-methyl-phenylmercapto) quinizarin is replaced by the same amount of 5-amino-8-(m- or p-methyl-phenylmercapto)-quinizarin.

Even more greenish dyeings can be obtained when the percentage proportion of 1,5-dihydroxy-4,8-diamino-3-anisylanthraquinone is increased.

Example 74 a. When a fabric of polyethylene terephthalate fibres is treated with 5-anilino-8-phenylmercapto-quinizarin according to the dyeing instruction given in Example 3(a), a deep dark blue dyeing of very good fastness to rubbing, sublimation and light is obtained.

b. The product used in Example 74(a) is obtained as follows:

36.6 parts 5-anilino-8-chloroquinizarin, obtained according to Example 22(b), are dissolved in 370 parts dimethyl formamide and the solution is mixed at 80°C. within 30 minutes with a solution of 29 parts potassium thiophenolate in 100 parts ethanol. The reaction product is immediately precipitated from the initially clear solution in the form of blue needles. The reaction is allowed to proceed for a further 15 minutes, then rendered weakly acidic with acetic acid. 300 parts methanol are added dropwise, and the product when cold filtered off with suction, washed wtih methanol and hot water, and dried. A yield of 42.3 parts is obtained.

Example 75 a. When a polyethylene terephthalate fabric is treated with the following compounds according to the dyeing instructions given in Example 3(a):

A. 5-anilino-8-(o-methyl-phenyl mercapto)-quinizarin
B. 5-anilino-8-(m-methyl-phenylmercapto)-quinizarin
C. 5-anilino-8-(p-methyl-phenylmercapto)quinizarin, dark blue dyeings are obtained which have comparable fastness properties but are more greenish than those of Example 75(a). The green tint increases in intensity from (A) to (C).

b. The compounds used in Example 75(a) can be obtained according to the instruction given in Example 74(b). In this case, instead of potassium thiophenolate, equal stoichiometric amounts of the corresponding potassium-methyl-thiophenolates are used.

Example 76 a. When a fabric of polyethylene terephthalate fibres is treated according to the dyeing instruction given in Example 3(a) with 5-m-toluidino-8-(m-methyl-phenylmercapto)-quinizarin, a dark blue dyeing of very good general fastness properties is obtained. Very similar dyeings are obtained when 5-m-toluidino-8-(o- or p-methyl-phenylmercapto)quinizarin is used instead of 5-m-toluidino-8-(m-methyl-phenylmercapto)quinizarin.

b. The product used in Example 76(a) is obtained as follows:

38 parts m-toluidino-8-chloroquinizarin in 300 parts dimethyl formamide are mixed at 80°C. with a solution of 31 parts of the potassium salt of m-methyl-thiophenol in 120 parts ethanol, the mixture is stirred for 15 minutes at the same temperature and the reaction product isolated as described in Example 74(b). 44.2 parts 5-m-toluidino-8-(m-methyl-phenylmercapto)-quinizarin are obtained.

c. A completely identical reaction yields 5-m-toluidino-8-(o- or p-methyl-phenylmercapto)-quinizarin, also in very good yields.

Example 77 a. When polyamide fibres are treated with 1,4-diamino-5-hydroxyethylamino-8-chloroanthraquinone as in Example 1(a), an intense reddish-blue dyeing is obtained.

b. The product used in Example 77(a) is obtained as follows:

15 parts of cold 1,4-diamino-5,8-dichloroanthraquinone is introduced into 45 parts ethanolamine and the mixture is heated to 160°C. over a period of 10 minutes. The melt becomes very viscous above 130°C. and begins to liquefy again at 155°C. As soon as the temperature begins to fall, the mixture is again heated to 165°C. for about 2 minutes and then allowed to cool. When the temperature falls to 80°, 100 parts of methanol are added and the mixture stirred until cold. The reaction product, crystallised in the form of broad needles, is filtered off with suction, wadhed with some methanol and dried. 12.7 parts 1,4-diamino-5-hydroxyethyl-amino-8-chloro-anthraquinone are obtained. Cl-content 12.0%, m.p. 190° – 192°C. Dark-blue needles with a red lustre, which dissolve in concentrated sulphuric acid to give an almost colourless solution. The solution turns a clear blue on addition of formaldehyde.

Example 78 a. When acetate rayon is treated according to Example 17(a) with 1,4-diamino-5-phenylmercapto-8-chloroanthraquinone, a violet dyeing of good fastness to light and sublimation is obtained.

b. The 1,4-diamino-5-phenylmercapto-8-chloroanthraquinone is obtained as follows:

11 parts 1,4 -diamino-5,8-dichloroanthraquinone are dissolved in 150 parts dimethyl formamide. This solution is maintained at boiling point for 6 hours, during which period a solution of 3.8 parts thiophenol in 30 parts ethanol and 3 parts potassium hydroxide is added dropwise at a constant rate. The mixture is allowed to react for a further hour; When the temperature reaches 60°C. it is diluted with 300 parts methanol, and then with 250 parts water, suction-filtered, and thoroughly washed with water. 1,4-diamino-5-phenylmercapto-8-chloroanthraquinone is obtained in good yield, in the form of a blue-violet crystalline powder which dissolves in concentrated sulphuric acid to given an orange-red solution turning clear blue-green with formaldehyde.

Example 79 a. When a polyethylene terephthalate fabric is treated according to the dyeing instructions given in Examples 3(a) and 5(a) with the mixture obtained as in Paragraph (b) of the present Example, violet dyeings of good fastness to sublimation are obtained.

b. The product used in Example 79(a) can be obtained as follows:

2 parts 1-amino-4-hydroxy-5,8-dichloroanthraquinone are stirred with 12 parts p-toluidine at 160°C. for 2 hours. Starting at 100°C., the melt is then diluted with 24 parts methanol, and the precipitated reaction product filtered off with suction at 60°C., and washed with methanol, hot dilute hydrochloric acid and water. A mixture of 1-amino-4-hydroxy-5-p-toluidino-8-chloroanthraquinone and 1-amino-4-hydroxy-8-p-toluidino-5-chloroanthraquinone in the form of felted violet needles is obtained in good yield.

Example 80 a. When a polyethylene terephthalate fabric is treated according to the dyeing instructions of Example 3(a) and 5(a) with the dyestuff mixture obtained as in Paragraph (b) of the present Example, blue-green dyeings fast to light and sublimation are obtained.

b. 9.5 parts of a mixture of 1-hydroxy-4,5-diamino-3-bromo-8-chloroanthraquinone and 1-hydroxy-4,8-diamino-3-bromo-5-chloroanthraquinone, 5.3 parts sodium acetate and 50 parts aniline are heated under reflux for 30 hours. After this time, only 5% starting material can be detected by chromatography. The reaction mixture is allowed to cool and stirred cold for about 12 hours. The product, precipitated in the form of blue needles, is filtered off with suction, washed successively with nitrobenzene, methanol and water, and dried. 6.2 parts of a chlorine-free mixture of 1-hydroxy-4,5-diamino-3-bromo-8-anilino-anthraquinone and 1-hydroxy-4,8-diamino-3-bromo-5-anilino-anthraquinone are obtained. Bromine content 19.5%.

Example 81 a. When a fabric of polyethylene terephthalate is dyed according to the dyeing instructions of Examples 3(a) and 5(a) with the dyestuff mixture obtained as in Paragraph (b) of the present Example, strongly greenish-blue dyeings of good fastness to light and very good fastness to sublimation are obtained.

b. 20 parts of a mixture of 1-hydroxy-4,5-diamino-3-bromo-8-chloroanthraquinone and 1-hydroxy-4,8-diamino-3-bromo-5-chloroanthraquinone, 12 parts sodium acetate and 100 parts 4-chloraniline are stirred at 190° - 200°C. for 32 hours. Starting at 120°C., the mixture is then diluted with 100 parts nitrobenzene and the precipitated product filtered off with suction at 35°C. and washed with nitrobenzene, methanol and water. A mixture of 1-hydroxy-4,5-diamino-8-(p-chloroanilino)-3-bromoanthaquinone and 1-hydroxy-4,8-diamino-5-(p-chloranilino)-3bromo-anthraquinone is obtained in the form of beautiful blue needles.

Example 82 a. 10 parts polyacrylonitrile skein material are dyed at boiling temperature for 1 hour in a bath consisting of 400 parts water, 0.1 part 1,4-diamino-5-(γ-dimethylamino-propylamino)-8-chloroanthraquinone, 0.3 part acetic acid (30%) and 0.1 part sodium acetate. After rinsing and drying, an intense reddish-blue dyeing of good fastness properties is obtained.

b. The 1,4-diamino-5-(γ-dimethylaminopropylamino)-8-chloroanthaquinone is obtained as follows:

30 parts 1,4-diamino-5,8-dichloroanthraquinone are heated with 180 parts γ-dimethylamino-propylamine at 95° - 98°C. until the melt, initially viscous, has become a mobile liquid and starting material can no longer be detected by chromatography (about 5 hours). The reaction mixture is allowed to cool and slowly diluted with 500 parts water. The 1,4-diamino-5-(γ-dimethyl-amino-propylamino)-8-chloranthraquinone, precipitated in the form of beautiful needles, is filtered off with suction, thoroughly washed with water and dried. 30 parts of a blue-violet crystalline powder are obtained. The solution is sulphuric acid is colourless, becoming deep blue on addition of formaldehyde. The colour of the solution in pyridine is clear blue.

Example 83 a. Polyacrylonitrile is treated according to the dyeing instruction of Example 82(a) with 1,4-diamino-5-chloro-8-(γ-trimethylamino-propylamino)-anthraquinone sulphate. A dyeing is obtained, which is very similar to that of Example 82(a) with regard to the shade and fastness properties, but somewhat weaker.

b. The 1,4-diamino-5-chloro-8-( -(γ-trimethylaminopropylamino)-anthraquinone sulphate is obtained as follows:

20 parts 1,4-diamino-5-chloro8-(γ-dimethylaminopropylamino)-anthraquinone, obtained according to Example 82(b), are quaternised at 70°C. with dimethyl sulphate in chlorobenzene as diluent. The precipitated quaternary salt is filtered off with suction, washed with benzene and dried. 24.5 parts are obtained.

Example 84 a. polyacrylonitrile skein material is treated according to the dyeing instructions of Example 82(a) with 1,4-diamino-5-hydroxyethylamino-8-(γ-dimethylamino-propylamino)-anthraquinone. As intense greenish-blue dyeing of good general fastness properties is obtained.

b. The 1,4-diamino-5-hydroxyethylamino-8-(γ-dimethylamino-propylamino)-anthraquinone is obtained as follows:

20 parts 1,4-diamino-5-hydroxyethylamino-8-chloroanthraquinone, obtained according to Example 77(b), are heated in 60 parts γ-dimethylamino-propylamine with the addition of a trace of copper acetate at 97°C. for 8 hours. The reaction mixture is stirred until cold, diluted with plenty of water, and the precipitated product filtered off with suction, washed and dried. 21 parts 1,4-diamino-5-hydroxyethylamino-8-(γ-dimethyl-amino-propylamino)-anthraquinone are obtained in the form of a violet-blue crystalline powder. The colour of the solution in concentrated sulphuric acid is pale red, turning intensely blue-violet on addition of formaldehyde. The colour of the solution in pyridine is a clear blue-green.

Example 85 a. Polyacrylonitrile is treated as in Example 82(a) with the mixture obtainable according to Paragraph (b) of the present Example. An intense red-violet dyeing is obtained.

b. 12 parts γ-dimethylamino-propylamine and 3 parts 1-amino-4-hydroxy-5,8-dichloroanthraquinone are heated on a boiling water bath for 1 hour. The reaction mixture is then slowly diluted with one part water, allowed to cool, and suction-filtered. A mixture of 1-amino-4-hydroxy-5-(γ-dimethylamino-propylamino)-8-chloroanthraquinone and the isomeric 1-amino-4-hydroxy-5-chloro-8-(γ-dimethylamino-propylamino)-anthraquinone in the form of violet needles. Chlorine content 9.9% is obtained in good yield.

What is claimed is:
1. Compounds of the formula

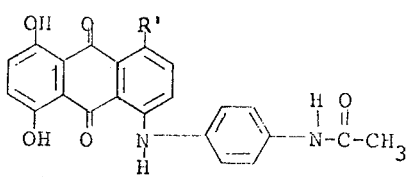

in which R' is selected from the group consisting of amino and alkylamino in which the alkyl group contains 1 to 4 carbon atoms.

2. The compound of the formula

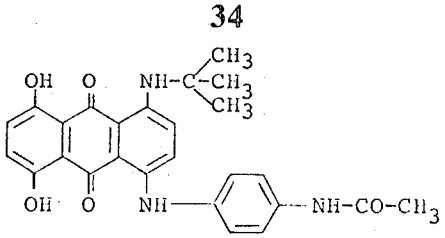

3. The compound of the formula

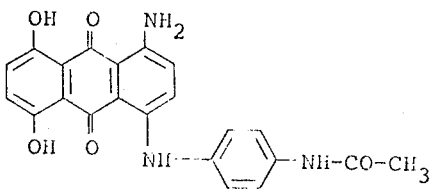

* * * * *